US010552761B2

(12) United States Patent
Tang et al.

(10) Patent No.: US 10,552,761 B2
(45) Date of Patent: Feb. 4, 2020

(54) NON-INTRUSIVE FINE-GRAINED POWER MONITORING OF DATACENTERS

(71) Applicant: UVic Industry Partnerships Inc., Victoria (CA)

(72) Inventors: Guoming Tang, Victoria (CA); Kui Wu, Victoria (CA); Fangming Liu, Hubei (CN)

(73) Assignee: UVic Industry Partnerships Inc., Victoria, BC (CA)

( * ) Notice: Subject to any disclaimer, the term of this patent is extended or adjusted under 35 U.S.C. 154(b) by 0 days.

(21) Appl. No.: 15/146,082

(22) Filed: May 4, 2016

(65) Prior Publication Data

US 2017/0322241 A1    Nov. 9, 2017

(51) Int. Cl.
G06N 20/00 (2019.01)
H02J 3/00 (2006.01)
H02J 13/00 (2006.01)
H02J 9/06 (2006.01)

(52) U.S. Cl.
CPC ............... *G06N 20/00* (2019.01); *H02J 3/00* (2013.01); *H02J 9/06* (2013.01); *H02J 13/0006* (2013.01); *H02J 2003/007* (2013.01); *Y02B 90/222* (2013.01); *Y02E 60/76* (2013.01); *Y04S 20/12* (2013.01); *Y04S 40/22* (2013.01)

(58) Field of Classification Search
CPC .............................. G01R 21/133; G06N 20/00
USPC ........................................................ 702/61
See application file for complete search history.

(56) References Cited

U.S. PATENT DOCUMENTS

| 9,020,770 B2 | 4/2015 | Gatts et al. | |
|---|---|---|---|
| 2009/0106571 A1* | 4/2009 | Low | G06F 9/4856 713/310 |
| 2011/0072293 A1* | 3/2011 | Mazzaferri | G06F 1/3203 713/340 |
| 2012/0053925 A1* | 3/2012 | Geffin | H05K 7/1498 703/21 |
| 2015/0261898 A1* | 9/2015 | Gupta | F01K 13/003 703/18 |
| 2017/0308137 A1* | 10/2017 | Oliveira | G06F 1/32 |

OTHER PUBLICATIONS

Tang et al., "Zero-Cost, Fine-Grained Power Monitoring of Datacenters Using Non-Intrusive Power Disaggregation", 12 pages (Dec. 7, 2015).

* cited by examiner

*Primary Examiner* — Marc Anthony Armand
(74) *Attorney, Agent, or Firm* — Klarquist Sparkman, LLP

(57) ABSTRACT

Technologies for performing non-intrusive fine-grained power monitoring of a datacenter are provided. Hardware component state information for servers in the datacenter is collected, along with aggregate power consumption measurements for the datacenter. The servers are grouped into multiple virtual homogenous server clusters (VHCs) based on characteristics of the servers. A power model is constructed comprising multiple power mapping functions associated with the multiple VHCs. Component state information of a particular server can then be analyzed, along with a corresponding aggregate power consumption measurement, using the constructed power model to determine an approximate power consumption of the particular server. The approximate power consumption of the server can then be displayed and/or provided to one or more power management applications.

20 Claims, 22 Drawing Sheets

PRIOR ART

NON-INTRUSIVE FINE-GRAINED POWER MONITORING OF DATACENTERS

FIELD

The technologies described herein relate to the field of power monitoring and regulation.

BACKGROUND

Datacenters are indispensable in the modern information technology (IT) landscape. They are deployed all over the world to host computing services and data storage. The energy consumption of datacenters is increasing dramatically due to the rapid expansion of datacenters in both number and scale. Energy expense is one of the most significant operating costs of datacenters. Companies like Amazon, Google, IBM, Microsoft, and Facebook pay millions of dollars every year for electricity. To minimize cost due to energy consumption, power management has become an important consideration when building and sustaining the operation of every datacenter. One essential key to effective power management is fine-grained power monitoring.

In datacenter operation, fine-grained power monitoring refers to power monitoring at the server level. It facilitates the implementation of various power management strategies, such as power capping and accounting, idle power elimination, cooling control, and load balancing. A fine-grained power monitoring platform can help audit the total energy use of the datacenter, and continuously show the real-time server-level power consumption. Such a platform greatly helps the datacenter operators to adjust power management policies and explore potential benefits. In cooling control for example, the real-time feedback of server-level power distribution can be used to provide leading information to locate thermal "hot spots" (i.e., server input air condition is too hot) that hamper the efficiency of the datacenter, and to define appropriate corrective action to optimize the air flow in the datacenter. Moreover, fine-grained power monitoring is also critical in the safe operation of datacenters. For example, the maximum power capacity of the datacenter may be quickly reached upon continuous scaling-out (i.e., adding computing resources) and scaling-up (i.e., upgrading IT facilities). Based on one survey, approximately 30% of enterprise datacenters could run out of the power capacity within 12 months. Accordingly, datacenter operators are faced with the dilemma of limited power capacity and increased power demand. That dilemma can be further magnified by the so-called "overbooking" practice, wherein the datacenter operators tend to overbook the power infrastructure for a high percentile of their needs. This practice of overbooking is based on the general knowledge that the nameplate power rating of a server is overprovisioned, and is therefore lower than its actual peak power, giving certain confidence that an extra number of servers can be added and supported within the power capacity of the datacenter. Unfortunately, overbooking can cause power deficits at some levels of the IT facilities and, in a worse case, an overrun or a system crash at a higher level can occur when power usage exceeds power capacity. Fine-grained power monitoring can help prevent the aftermath of this unsafe practice of overbooking. However, one major challenge in fine-grained power monitoring is that not all types of servers in the datacenter are equipped with power sensors. This holds true especially when a datacenter uses a diverse set of legacy servers, high-density blade servers, and enclosures. The DELL POWEREDGE M100e and the IBM BLADECENTER HHPE PROLIANT DL380 series are examples of widely used blade servers not equipped with power sensors. To monitor their power usage, power meters are typically installed at power distribution units (PDU) or at the rack-level. Power monitoring in this case, however, is not fine-grained.

In general, power monitoring solutions can be organized into two categories: hardware-based power monitoring and software-based power monitoring. Metered rack PDUs, intelligent power strips, and power clamps are examples that belong to the hardware-based power monitoring solution category. Metered rack PDUs can provide rack-level power monitoring (i.e., not server-level power monitoring), wherein the aggregate load on the circuit is monitored. Some intelligent power strips can provide indications of electrical load or power drawn by every outlet connected to a computing device. Power clamps can facilitate the manual measurement of power drawn by an individual server, but the manual method associated with this instrument cannot provide real-time power monitoring when large numbers of servers are involved. In addition, these hardware-based solutions require additional costs associated with purchasing, installation, and maintenance. If a large number of servers is involved, integrating hardware-based solutions can also cause space constraints within the datacenter facility.

On the other hand, software-based power monitoring solutions are typically more cost-effective compared to their hardware-based counterparts. In a software-based solution, power models can be used to estimate the power consumption of a server using information collected at a server level, a component-level, and/or an application-level. Power models can be trained based on a correlation between a state or utilization of a hardware component and a power consumption of the hardware component.

For example, Gatts and Yellick, U.S. Pat. No. 9,020,770 (Gatts) teaches a computer-usable program product and data processing system that uses a power estimation model, which correlates one type of factor at a time, to correlate with the power consumption of a particular server in a datacenter. Such a factor can be the processor utilization, memory utilization, network throughput, I/O rate, temperature or heat output, or fan noise or speed. For clarity, the prior art shows that processor utilization alone can be used to correlate with the power consumption of a first server, memory utilization alone with the power consumption of a second server, I/O rate alone with the power consumption of a third server, and so on. FIG. 1 depicts a schematic diagram of the method of power estimation described in Gatts.

While it can work well on certain cases of the datacenter operation, the approach in Gatts can provide sub-optimal estimation of server-level power consumption in cases where multiple components within a server are simultaneously consuming significant power to support various tasks or workloads of the datacenter. To illustrate, a first server may draw significant power for both its central processing unit (CPU) and graphics processing unit (GPU) only to undertake one task, while a second server may draw significant power for its CPU, memory and storage disk to undertake a different kind of task.

Lastly, current software-based solutions require power model training, but certain methods in this category require power measuring at the server-level or a lower-level during an initial training phase, even if no hardware-based power measuring is needed afterwards. Hardware-based power measuring during the initial training phase makes such methods intrusive.

Therefore, given the limitations and challenges associated with previous hardware-based and software-based solutions, there exists a need for a better approach, that is low-cost and non-intrusive, to facilitate real-time fine-grained power monitoring of datacenters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method, implemented by one or more computing devices, comprises grouping a plurality of servers in a datacenter into multiple virtual homogenous server clusters (VHCs), collecting component state information of the plurality of servers in the datacenter, wherein component state information of the servers is associated with the VHCs in which the servers are grouped, creating a power model comprising multiple power mapping functions associated with the multiple VHCs, wherein a power mapping function is created using the component state information collected for an associated VHC, determining an aggregate power consumption of the datacenter, determining an approximate real-time power consumption of one or more servers in a VHC, of the multiple VHCs, using the power mapping function associated with the VHC, the total power consumption of the datacenter, and a current component state information of the one or more servers, and outputting the approximate real-time power consumption of the one or more servers.

In another embodiment, a system comprises a datacenter comprising a main power supply and a plurality of servers, wherein the plurality of servers comprise multiple hardware components. The system further comprises a datacenter power data collector connected to the main power supply of the datacenter and configured to determine an aggregate power consumption of the plurality of servers in the datacenter, and a component state collector connected to the plurality of servers and configured to retrieve component state information for the multiple hardware components from the plurality of servers. The system further comprises a power estimator configured to receive and analyze data from the datacenter power data collector and the component state collector, update a power model comprising one or more power mapping functions based on the analysis of the data from the datacenter power data collector and the component state collector, and use the one or more power mapping functions to determine an approximate power consumption of one or more of the plurality of servers. The system further comprises a display device connected to the power consumption estimator and configured to display the approximate power consumption of the one or more of the plurality of servers determined by the power consumption estimator.

In another embodiment, one or more computer-readable media store computer-executable instructions for causing one or more processors, when programmed thereby, to perform operations comprising identifying VHCs in a datacenter and creating a training dataset by: collecting component state information comprising hardware component utilization metrics for the servers in the datacenter at multiple times, collecting aggregate power consumption readings for the datacenter at multiple times by accessing an interface to a main power supply of the datacenter, and associating the collected component state information with the collected aggregate power consumption readings based on corresponding collection times. The operations further comprise using the training dataset to create multiple power model functions associated with the multiple VHCs, receiving a component state vector for a server in the datacenter comprising hardware component utilization metrics for the server at a particular time, determining an aggregate power consumption for the datacenter at the particular time by accessing the interface to the main power supply of the datacenter, identifying a VHC, of the multiple VHCs, to which the server belongs determining an estimated power consumption of the server using a power mapping function, of the multiple power mapping functions, associated with the identified VHC, the received component state vector, and the determined aggregate power consumption for the datacenter, and providing the estimated power consumption of the server to one or more datacenter power management applications.

As described herein, a variety of other features and advantages can be incorporated into the technologies as desired.

DETAILED DESCRIPTION

As used herein, the term "fine-grained power monitoring" refers to estimating and/or detecting power consumption in a datacenter at the server-level and/or at the server rack-level.

As used herein, the term "aggregate power consumption" refers to the total electrical power consumed or used by the datacenter as a result of energizing a collection of servers or computing devices. An aggregate power consumption, or total power consumption, of a datacenter can be, for instance, read or collected from a main power supply of the datacenter, such as an uninterrupted power supply (UPS) or a power distribution unit (PDU), of the datacenter.

As used herein, the term "component state information" refers to data relating to the utilization of hardware components of a server. Hardware components of a server can include a central processing unit (CPU), a graphical processing unit (GPU), a memory, a storage device (such as a hard disk drive, solid state drive, or the like), and/or a network interface card (NIC). Component state information can include, but is not limited to, CPU utilization, GPU utilization, memory utilization, storage device utilization (such as disk or NAND/NOR reading and writing), network traffic (such as receiving and sending data), and other relevant hardware performance monitoring counters of the server or computing device. A "major hardware component," as used herein, refers to a component of a server or computing device that consumes a significant amount of electrical energy. In some embodiments only utilization of major hardware components is tracked as part of the component state information.

A "training dataset," as used herein, can refer to power data collected during a set time interval for use in training one or more power model functions (PMFs). The power data can comprise a set of values associated with an aggregate power consumption of the datacenter and corresponding component state information that are collected at certain time instants within the set time interval.

Technologies described herein can be used for non-intrusive fine-grained power monitoring of datacenters. In some embodiments, technologies described herein can be used for real-time estimation of power consumption of a server or computing device in a datacenter by analyzing the aggregate power consumption of the entire datacenter and the utilization of major hardware components (i.e., component state information) of servers or computing devices running within the datacenter.

Figure 1:
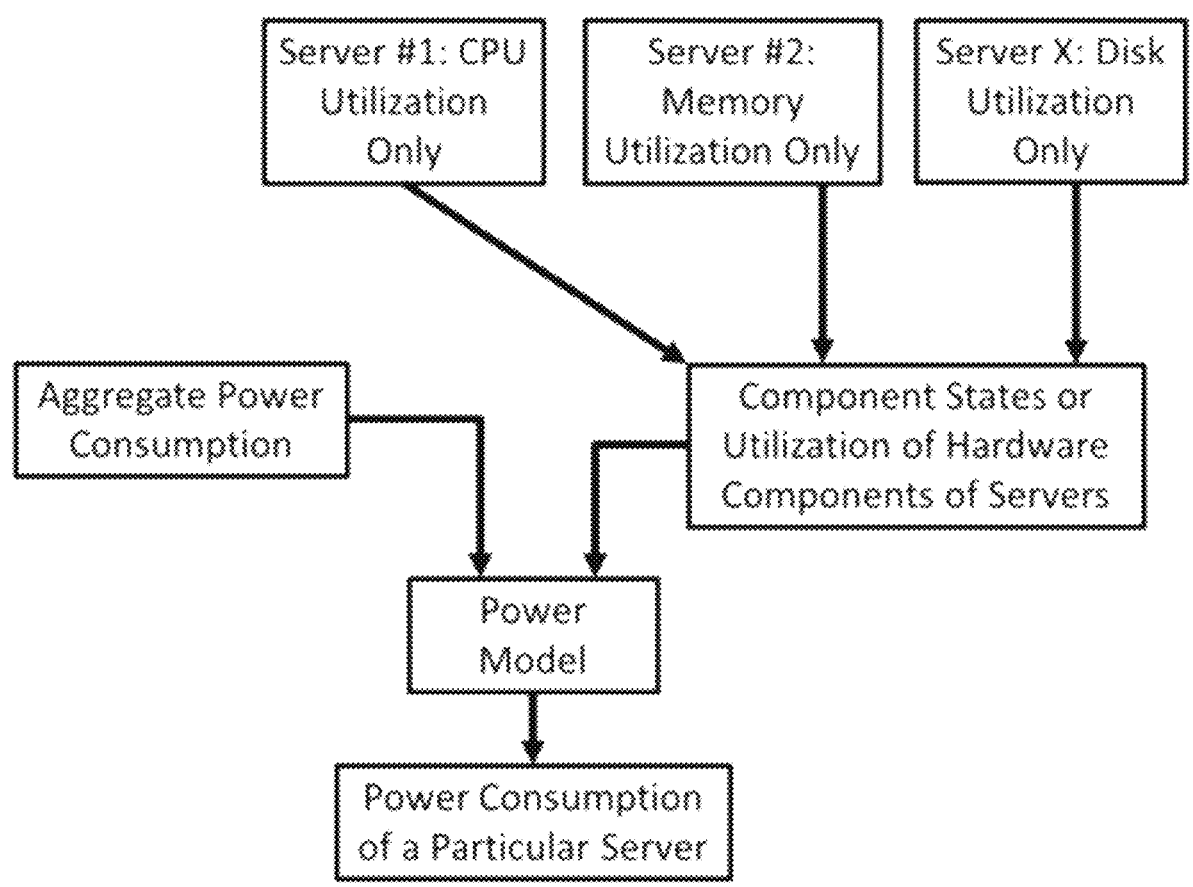
FIG. 1 is a schematic diagram depicting a prior art method of power estimation as described in Gatts.
Figure 2:
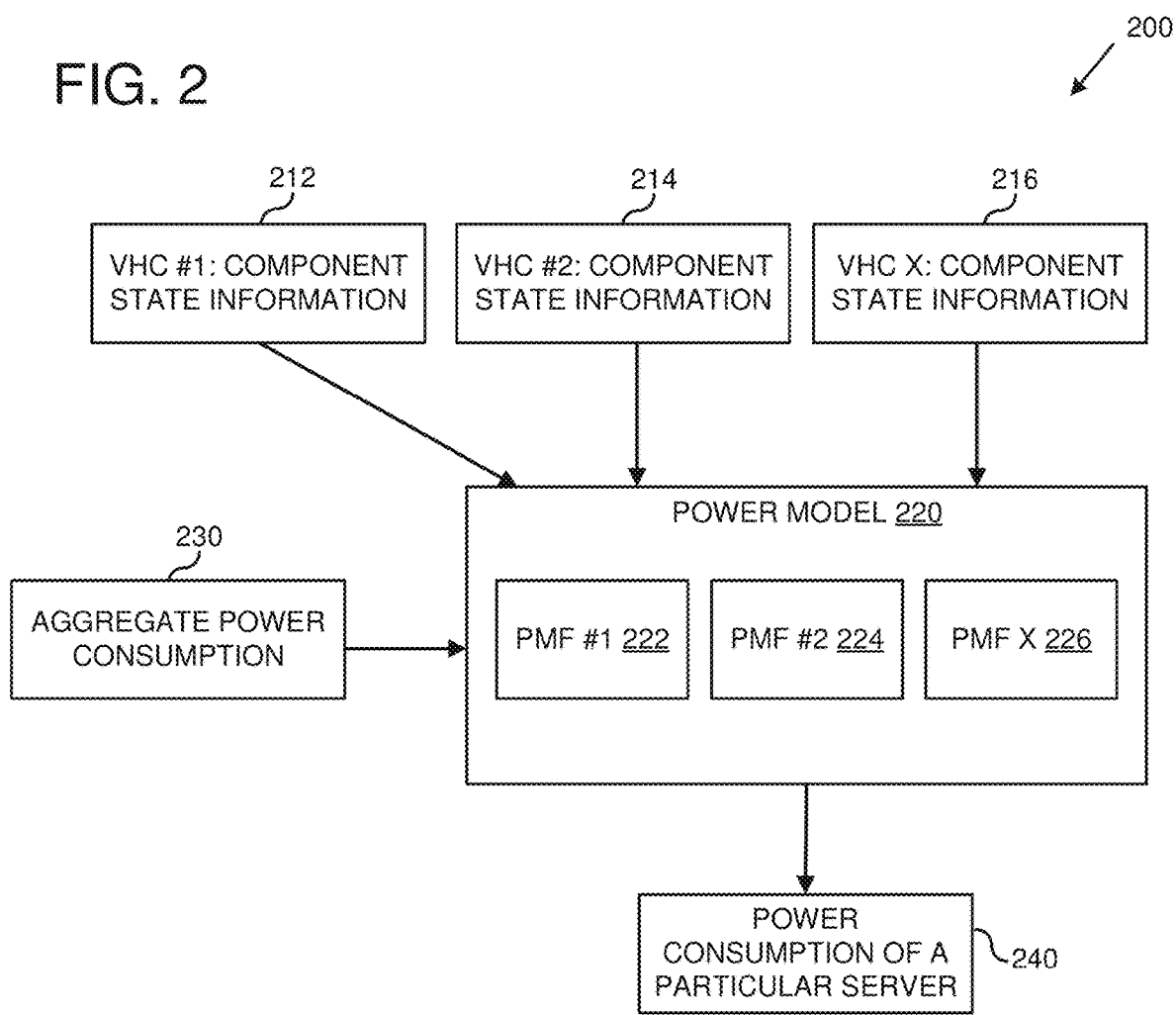
FIG. 2 is a schematic diagram depicting an example method of power estimation using component state information for multiple virtual homogenous server clusters.

For example, FIG. 2 shows an example schematic diagram 200 depicting power estimation using component state information for servers in multiple virtual homogenous server clusters (VHCs) 212-216. A power model 220 is constructed to correlate the component state information 212-216 with power consumption of particular servers. The power model 220 takes an aggregate power consumption of the datacenter 230 and component state information 212-216 as its input, and provides an estimated power consumption of a particular server as its output 240. In at least some embodiments, power model 220 comprises multiple power mapping functions 222-226 associated with corresponding VHC component state information 212-216.

When implemented, the technologies described herein do not require any manual measurement of power using hardware tools when training the power model 220 in the initial stages of its use. In short, the technologies described herein involve a non-intrusive power disaggregation (NIPD) approach to estimating power consumption at the server level.

Figure 3:
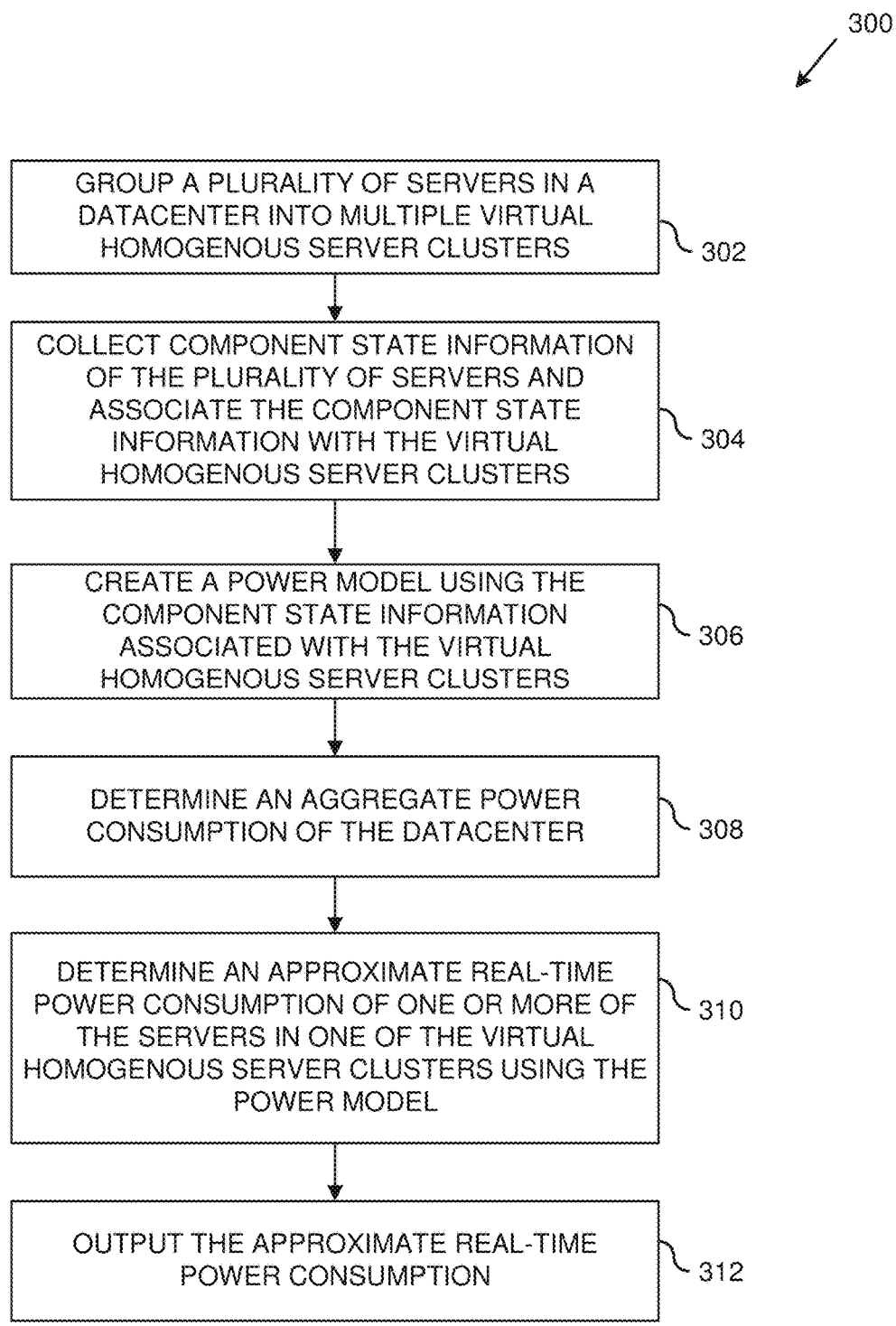
FIG. 3 is a flowchart depicting an example method for approximating real-time power consumption of one or more servers in a datacenter.

FIG. 3 is a flowchart depicting an example method 300 for approximating real-time power consumption of one or more servers in a datacenter. Any of the example systems described herein can be used to perform method 300. At 302, a plurality of servers in a datacenter are grouped into multiple VHCs.

At 304, component state information of the plurality of servers is collected and associated with the VHCs. For example, for each server for which component state information is collected, a VHC to which the server belongs can be identified and the component state information of the server can be associated with the identified VHC.

At 306, a power model is created using the component state information associated with the VHCs. In some embodiments, the power model comprises multiple power mapping functions corresponding to the VHCs. For example, different PMFs can be associated with the VHCs. Component state information associated with a particular VHC can be associated with a PMF corresponding to the VHC.

At 308, an aggregate power consumption of the datacenter is determined. At 310 an approximate real-time power consumption of one or more of the servers in one of the VHCs is determined using the power model. For example, component state information for one or more servers in the datacenter for a particular time can be received and analyzed using the power model to determine an approximate power consumption of the one or more servers as of the particular time. In embodiments where the power model comprises multiple PMFs, a VHC for the one or more servers can be identified and a PMF associated with the VHC can be used to analyze the received component state information and to produce the approximate real-time power consumption.

At 312, the approximate real-time power consumption of the one or more servers is output. The power consumption can be, for example, displayed using a display device.

Alternatively, the power consumption can be transmitted to a server over a computer network. For example, in some embodiments the received component state information for the one or more servers can be received from a computing device via the computing network. In such embodiments, the approximate real-time power consumption can be transmitted to the computing device over the computer network.

Figure 4:
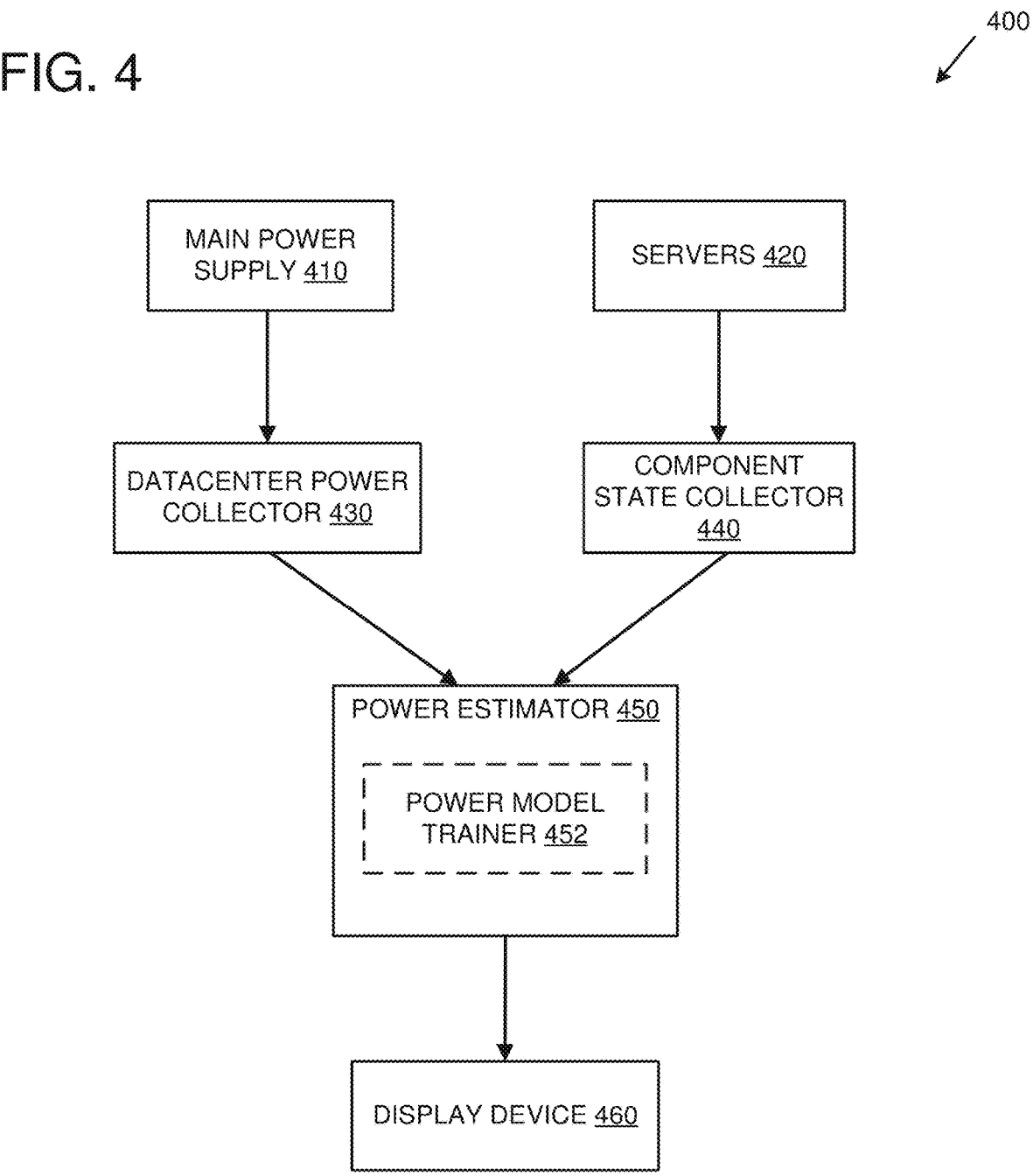
FIG. 4 is a diagram depicting an example system for approximating real-time power consumption of servers in a datacenter.

FIG. 4 is a diagram depicting an example system 400 for approximating real-time power consumption of servers in a datacenter. System 400 comprises: a datacenter power collector 430 that is linked to a main power supply 410 that energizes the datacenter, a component state collector 440 that is linked to a plurality of servers 420 in the datacenter, a power estimator 450 configured to receive and analyze data from the datacenter power collector 430 and the component state collector 440, and a display device 460 configured to output a power estimation result from the power estimator 450. In some embodiments, the power estimator 450 comprises a power model trainer 452. In alternative embodiments, the power model trainer 452 is separate from the power estimator 450 and connected separately to the datacenter power collector 430 and the component state collector 440. In such embodiments, power model trainer 452 can be connected to power estimator 450 and configured to provide and/or update a power model (not shown) used by the power estimator 450 for producing power estimates.

Figure 6:
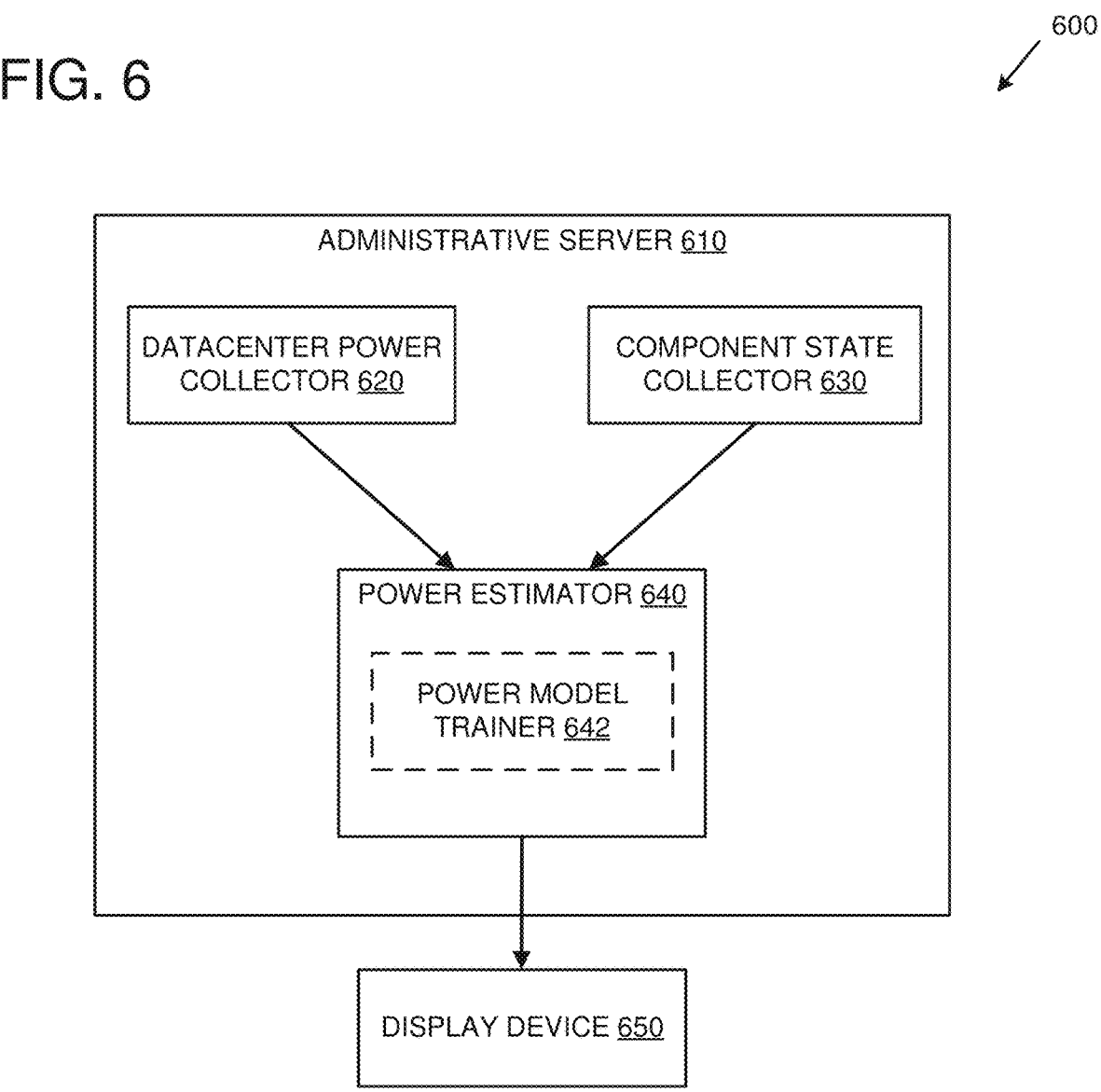
FIG. 6 is a diagram depicting an example system for estimating power consumption of servers in a datacenter comprising a single administrative server.
Figure 7:
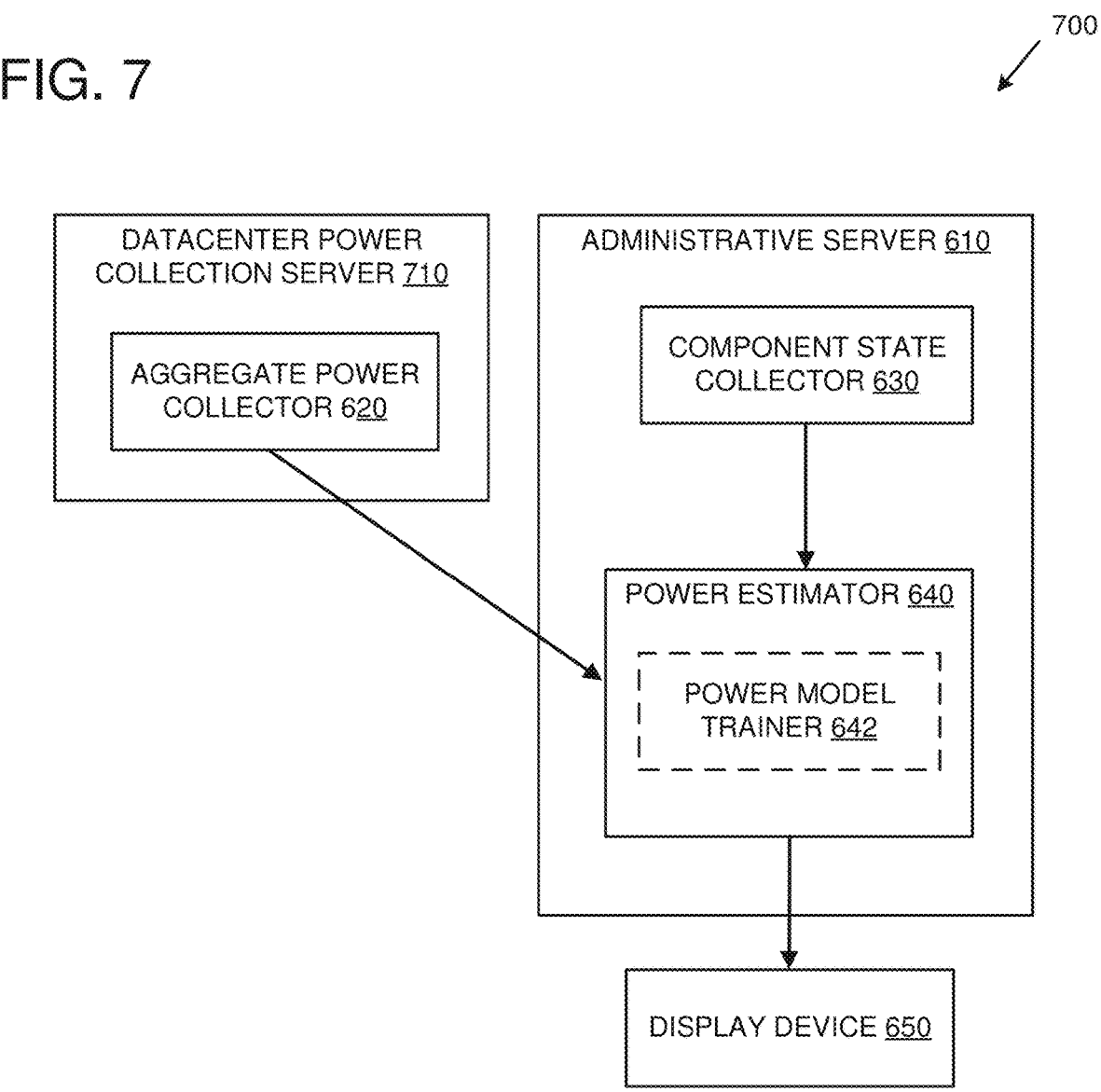
FIG. 7 is a diagram depicting another example system for estimating power consumption of servers in a datacenter comprising an administrative server and a datacenter power collection server.

The power estimator 450, the power model trainer 452, the datacenter power collector 430, the component state collector 440, and the display device 460 can comprise one or more computing devices. In some embodiments, power estimator 450, the power model trainer 452, the datacenter power collector 430, the component state collector 440, and the display device 460 are implemented using and/or integrated into existing computing hardware of the datacenter. Although they are described independently, these components may be located collectively in one server or distributed across multiple servers depending on application requirements. For example, FIG. 6 depicts an example system 600, wherein a power estimator 640, a power model trainer 642, a component state collector 630, and a datacenter power collector 620 are located in a single administrative server 610 connected to a display device 650. FIG. 7 depicts another example system 700, wherein the power estimator 640, the power model trainer 642, and the component state collector 630 are located in a single administrative server 610 connected to a display device 650, and an aggregate power collector 620 is located in a separate datacenter power collection server 710. For example, datacenter power collection server 710 can be a server with close proximity to a main power supply of the datacenter. The administrative server 610 and the datacenter power collection server 710 can communicate with one another through a wired or wireless connection. In the examples described herein, the administrate server 610 can be a computing device located outside the datacenter.

These example implementations are meant to show examples only, and are not intended to be limiting.

Returning to FIG. 4, in at least one embodiment, the power model used by power estimator 450 comprises multiple PMFs that are used to determine the approximate power consumption of a particular server or a plurality of servers in the datacenter. A PMF can correlate state or utilization of hardware components of a server to an overall power consumption of the server.

A PMF can comprise a constant term and/or a plurality of variable terms. The constant term can indicate an idle or static power consumption of the server or group of servers. The plurality of variable terms can indicate a dynamic power consumption of the server or group of servers when the server or group of servers are running a specific workload. The constant term can be determined by measuring aggregate power changes upon turning one or more groups of idle servers off and on, and subsequently performing a least square minimization analysis by using the said aggregate power changes and the number of idle servers that were turned off and on as inputs. The variable terms can comprise coefficient values that are determined by measuring the aggregate power consumption of the datacenter at different time instants and the component states of servers in the datacenter at the corresponding time instants, and subsequently performing a least square minimization analysis by using the aggregate power consumption of the datacenter and the associated component states as inputs.

In a different or further embodiment, power model trainer 452 periodically updates the PMFs with updated variable term coefficient values and constant terms upon analysis of training datasets collected through selective means. These training datasets can include aggregate power consumption of the datacenter and the component state information of the plurality of servers in the datacenter. In some cases, calculated medians are used in these training datasets in order to alleviate the effect of outliers and make the PMF training robust.

In some embodiments, datacenter power collector 430 is an interface associated with, or built-in to, the main power supply 410 that energizes the datacenter. The main power supply 410 can comprise a UPS and/or one or more power distribution units (PDUs). In some embodiments, the datacenter power collector 430 can be a vendor-developed interface for the UPS and/or the one or more PDUs. The interface can be used to collect measurement readings for the aggregate power consumption of the datacenter. In some further embodiments, the interface can also be used to display the collected measurement readings.

In at least one embodiment, component state collector 440 collects data relating to the state or utilization of major hardware components of the servers 420 running in the datacenter. These data can include index values for CPU utilization, GPU utilization, memory utilization, disk reading and/or writing, network traffic (e.g., receiving and sending data), and/or other relevant hardware performance monitoring counters. For example, the state or utilization of more than one major hardware component can be collected for each of the servers 420 in order to improve the accuracy of the estimation of server-level power consumption. The component state collector 440 can use one or more resource statistic tools, such as dstat, vmstat, iostat, mpstat and netstat, to gather various component states of a server or a plurality of servers.

An example method for fine-grained power monitoring comprises: collecting an aggregate power consumption of a datacenter from a main power supply; collecting component state information of a plurality of servers in the datacenter; grouping the plurality of servers in the datacenter into multiple VHCs; constructing a power model that uses at least one power mapping function associated with every VHC; analyzing the aggregate power consumption of the datacenter and the component state information of a plurality of servers using the constructed power model; and outputting an approximate real-time power consumption of one or more servers of the plurality of servers in the datacenter.

Figure 8:
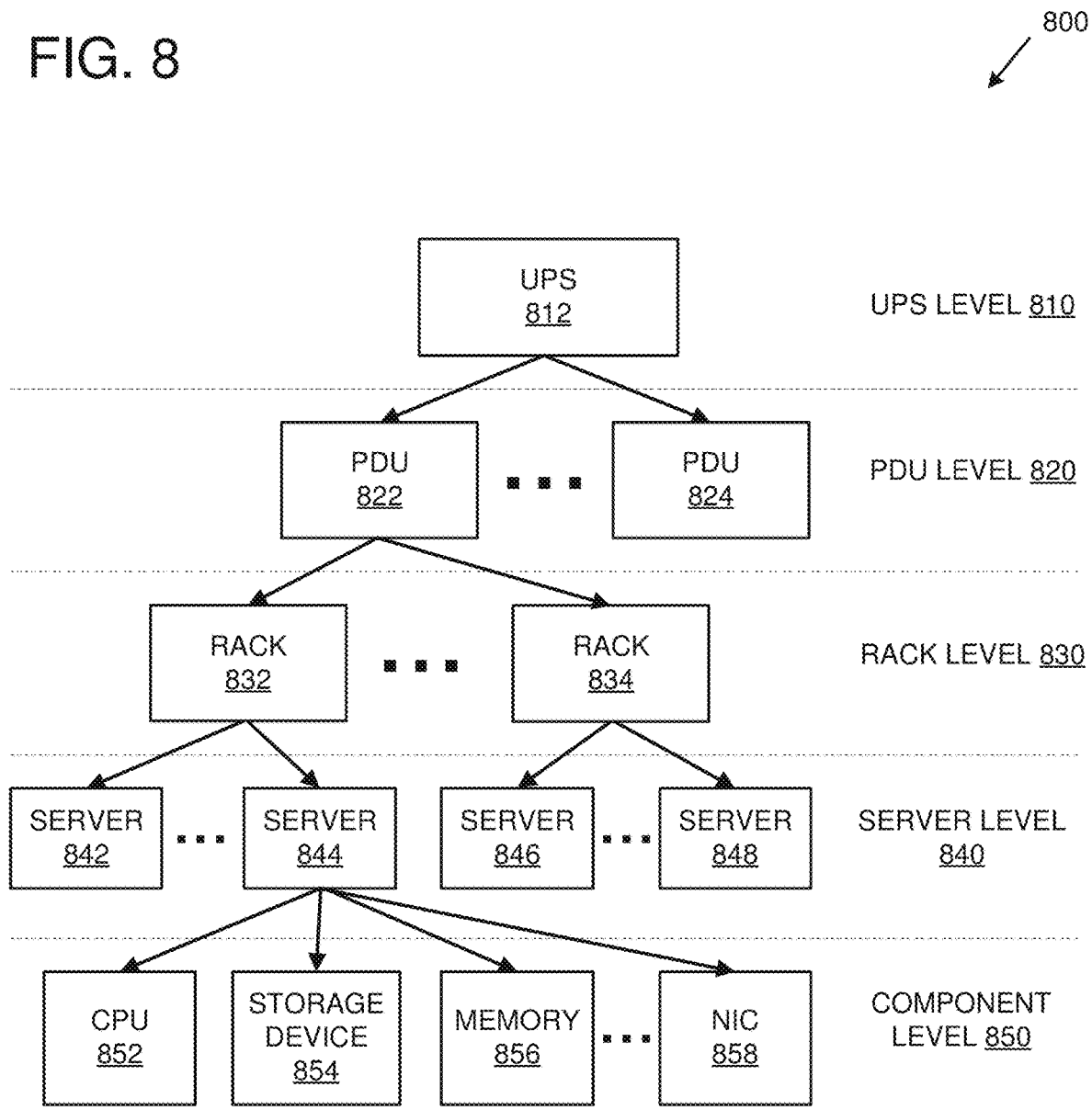
FIG. 8 is a diagram depicting an example power distribution hierarchy of IT facilities in a datacenter, wherein a component level is a lowest level and an uninterruptible power supply (UPS) level is a highest level.

FIG. 8 is a diagram depicting an example power distribution hierarchy 800 of IT facilities in a datacenter. Power distribution originates at a UPDS level 810, where power is distributed from a UPS 812 to one or more PDUs 822-824 at a PDU level 820. Each of PDUs 822-824 is configured to distribute power to one or more server racks 832-834 at a subsequent rack level 830. Each server rack 832-834 then distributes power to one or more servers 842-848 at a server level 840. Power is then distributed to one or more hardware components within a server (e.g., hardware components 852-858 of server 844) at a component level 850.

Figure 9:
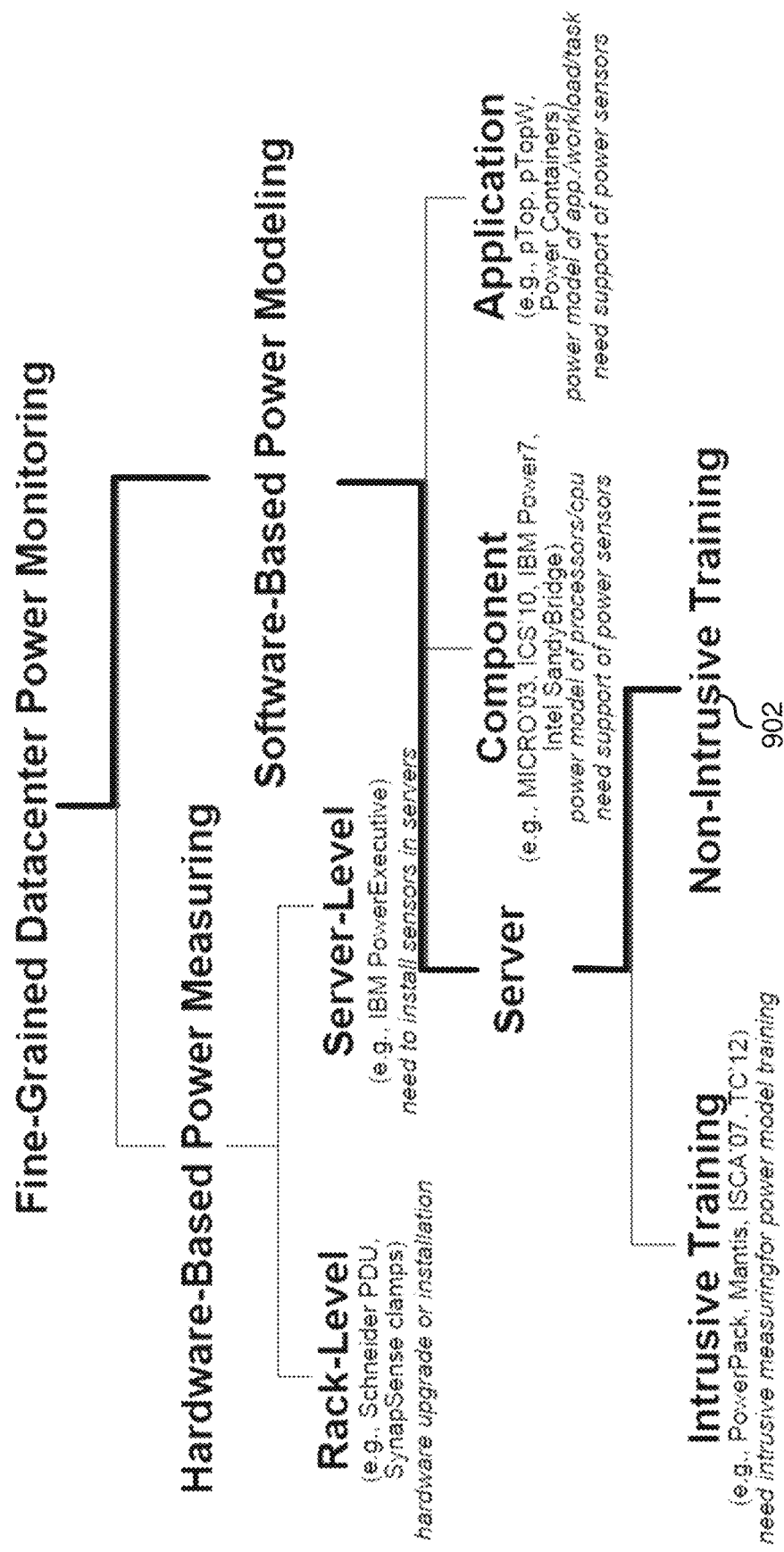
FIG. 9 is a diagram depicting a classification of fine-grained power monitoring solutions for datacenters, wherein both hardware-based and software-based approaches are shown.

FIG. 9 is a diagram depicting a classification 900 of example fine-grained power monitoring solutions for datacenters, showing examples of both hardware-based power measuring and software-based power modeling. At least some of the technologies described herein can be categorized as non-intrusive training at the server level 902.

Figure 10:
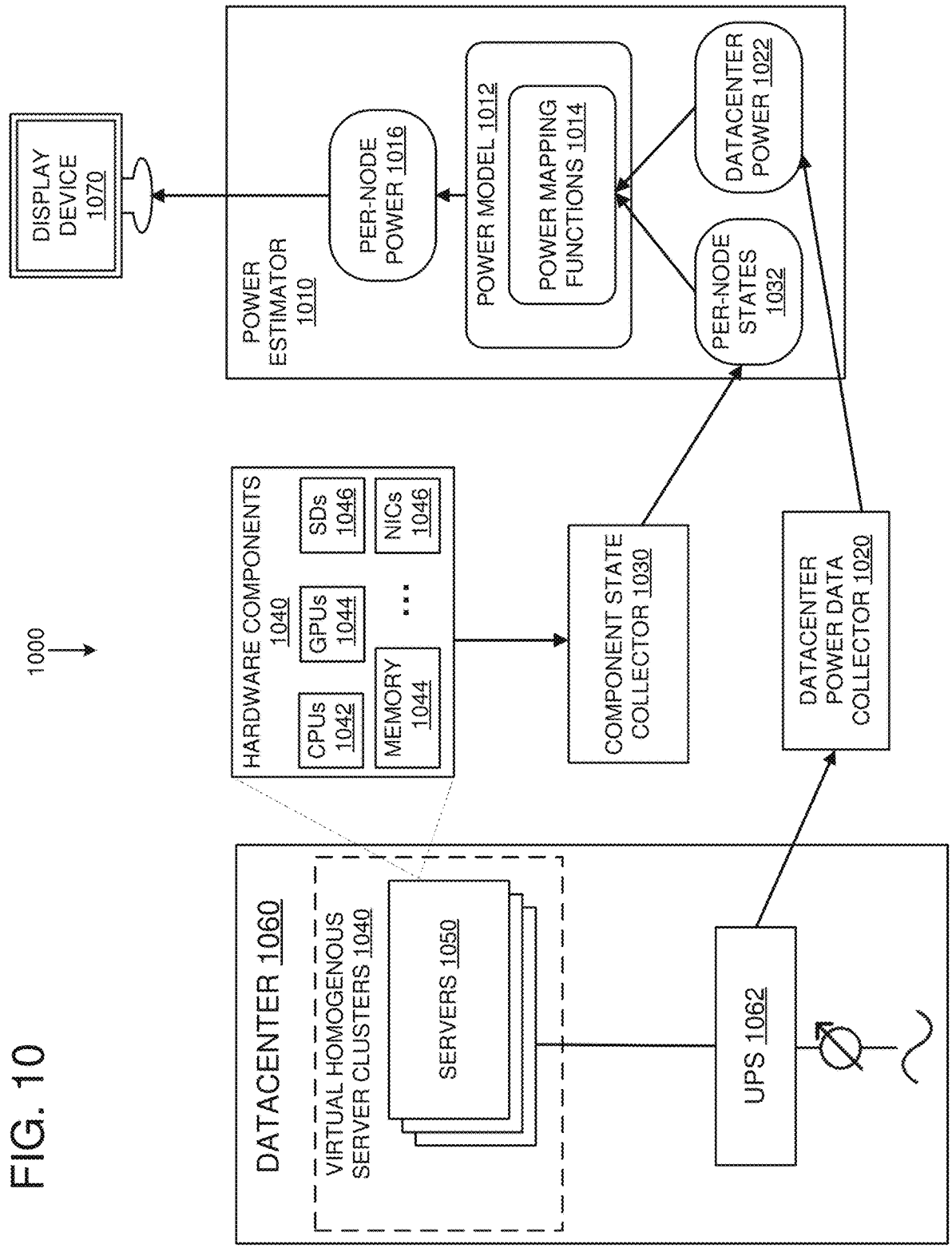
FIG. 10 is a diagram depicting an example system for non-intrusive power disaggregation (NIDD) for a datacenter.

FIG. 10 is a diagram depicting an example system 1000 for non-intrusive power disaggregation (NIPD) for a datacenter 1060. The aggregate power consumption of the datacenter can be collected by reading an embedded meter or vendor-provided interface linked to a main power supply 1062 of the datacenter 1060. For example, a datacenter power collector 1020 reads the embedded meter or vendor-provided interface of power supply 1062. Component state information of servers 1050 in the datacenter 1060 can be automatically and transparently collected by a component state collector 1030 that is connected to or integrated in at least one of the servers 1050 in the datacenter 1060.

Servers 1050 can be grouped into virtual homogenous clusters of servers (VHCs) 1040. A VHC comprises a group of servers with a same or similar type of major hardware components. In some embodiments, one PMF 1014 is created for and associated with each VHC of VHCs 1040. In such embodiments, every server within the same VHC will use the same PMF. A PMF correlates state or utilization of multiple major hardware components of a server with an overall power consumption of the server. Since the datacenter 1060 can have multiple VHCs 1040, multiple PMFs 1014 can be needed to establish a fine-grained power monitoring of datacenter 1060.

A PMF can be expressed as a linear or a non-linear relationship between the state of the major components of a server and a power consumption of the server. In some cases, the linear relationship is preferred due to its lower computational complexity as compared to the non-linear relationship. In some embodiments, the PMFs 1014 are continuously trained with power data (e.g., training datasets) from the running datacenter 1060. Online training of the PMFs 1014 can use training datasets collected through selective means. For example, component state collector 1032 can provide per-node component states 1032 to power estimator 1010. Datacenter power collector 1020 can provide datacenter power measurements 1022 to power estimator 1010. Power estimator 1010 can use the per-node component states 1032 and the datacenter power measurements to train the PMFs 1014 that are a part of power model 1012 and that are associated with VHCs 1040. The power estimator 1010 can use power model 1012 comprising PMFs 1014 to produce per-node power estimates 1016. Display device 1070 can receive per-node power estimates 1016 from power estimator 1010 and display the per-node power estimates to a user.

In some cases, such online training of the PMFs 1014 and selective collection of training datasets can improve the precision of power disaggregation and support for running fine-grained power monitoring in real-time.

The following examples elaborate on governing principles, implementations, and results of fine-grained non-intrusive power monitoring.

Example 1—Model Designs for NIPD

In this example, the problem of NIPD for fine-grained power monitoring in datacenters is formally defined, and example solutions for training and updating power models used in NIPD are provided. Table 1 provides a summary of notations used herein:

TABLE 1

Summary of notations

| Notation | Description |
| --- | --- |
| m | number of servers |
| n | number of component state |
| r | number of virtual homogeneous clusters (VHCs) |
| y | aggregate power vector of datacenter |
| $y_j^{(i)}$ | power consumption of the i-th server at time j |
| $s_j^{(i)}$ | state vector of the i-th server at time j |
| $\mu_{n,j}^{(i)}$ | the n-th component state of server i at time j |
| $d_j^{(r)}$ | on/off number of servers in the r-th VHC at time j |
| $w^{(k)}$ | coefficient vector of PMF of the k-th VHC |
| $\tilde{w}$ | coefficient vector of PMFs of all VHCs |
| T | transpose operation of vector when used as a superscript |

In a datacenter consisting of m servers, an aggregate power consumption of the m servers sampled in a time interval [1, t] can be denoted by an aggregate power vector as:

$$y := [y_1, y_2, \ldots, y_t]^T. \quad \text{(Equation 1)}$$

A power consumption of the i-th (1≤i≤m) server in the same time interval, which is unknown, can be denoted by an individual power vector as:

$$y^{(i)} := [y_1^{(i)}, y_2^{(i)}, \ldots, y_t^{(i)}]^T. \quad \text{(Equation 2)}$$

State information of components collected from each server can be recorded in a state vector s containing the n scalars ($\mu_1, \mu_2, \ldots, \mu_n$), wherein n is a number of components whose information is available:

$$s := [\mu_1, \mu_2, \ldots, \mu_n]. \quad \text{(Equation 3)}$$

Accordingly, the state vector of the i-th server at time j(1≤j≤t) can be represented as:

$$s_j^{(i)} := [\mu_{1,j}^{(i)}, \mu_{2,j}^{(i)}, \ldots, \mu_{n,j}^{(i)}], \quad \text{(Equation 4)}$$

in which $\mu_{k,j}^{(i)}$ represents a value of the k-th (1≤k≤n) component state in the i-th server at time instant j.

During a time interval [1, t], given the aggregate power vector y of m servers and each server's state vector $s_j^{(i)}$, 1≤i≤m, 1≤j≤t, non-intrusive power disaggregation (NIPD) can be performed by estimating the power consumption of each individual server at each time instant, i.e., $y_j^{(i)}$, 1≤i≤m, 1≤j≤t.

To perform NIPD, the servers in the datacenter are first logically divided into multiple VHCs, such that, for each VHC, the major hardware components (e.g., CPU, GPU, memory, storage device(s), and/or NIC) of servers in the VHC are the same or similar (e.g., same or similar makes and models, same or similar capacities, same or similar performance characteristics, and/or same or similar power consumption characteristics). Thus, if a datacenter is composed by r(r≥1) types of servers, the servers can be divided into r VHCs.

For servers in the same VHC, a power mapping function (PMF) can be defined as f: $R^n \to R$, such that the input of a server's state vector at any time instant can yield the server's power consumption at the corresponding time instant; i.e., for the i-th server's state vector at time j, $s_j$, $f(s_j^{(i)})$ approximates $y_j^{(i)}$.

A linear model can capture the relationship between the power consumption of a server and its component state. The computational complexity of the linear model can be much lower than that of non-linear models. Therefore, in some cases it can be preferable to first model the PMF as a linear function, i.e., to initially model a server's power consumption by the linear combination of the server's component states. For servers in a same VHC, with the state vector s in Equation 3, a PMF for the VHC can be defined as:

$$f(s) = [1,s]w, \quad \text{(Equation 5)}$$

wherein w is a coefficient vector denoted as:

$$w = [w_0, w_1, w_2, \ldots, w_n]^T. \quad \text{(Equation 6)}$$

Some previous methods try to build a power model for each major component in a server, which are then used to estimate the power consumptions of each component in the server. In those methods, the server's power consumption is approximated by the aggregate of the estimated power consumption of its major components. Contrastingly, the PMFs described herein can be regarded as a special type of power model that are different from the ones used in the previous methods. For example, a PMF, as described herein, can indicate a way of mapping a server's major components' states to the server's overall power consumption. The power of uncovered components, such as fans within the server enclosure, can be properly absorbed (in the sense that $f(s_j^{(i)})$ can best approximates $y_i^{(i)}$ by the components modeled in the PMF. Hence, the power consumption of each component modeled in a PMF is not necessarily the true value.

Moreover, the overall power consumption of a server $f(s)$ can be broken down into two parts: idle power (or static power) and dynamic power. The former is considered as a baseline power supplied to maintain a server system in an idle state, while the latter is an additional power consumption for running specific workloads on the server system. In the PMF coefficient vector w (Equation 6), $w_0$ is a constant term that models the idle power, and $w_1, w_2, \ldots, w_n$ are coefficients associated with the dynamic power of different components.

The coefficients of a server's PMF can be estimated. For example, in a datacenter that comprises r VHCs, wherein $m_k$ servers are in a k-th ($1 \le k \le r$) VHC, and wherein each server of the k-th VHC reports the states of $n_k$ components, using the state vector s (Equation 3), the PMF for the k-th VHC can be expressed as:

$$f_k(s) = [1,s](w^{(k)})^T, \quad \text{(Equation 7)}$$

wherein $w^{(k)}$ is the coefficient vector of the PMF for the k-th VHC and can be denoted as:

$$w^{(k)} = [w_0^{(k)}, w_1^{(k)}, w_2^{(k)}, \ldots, w_{n_k}^{(k)}]. \quad \text{(Equation 8)}$$

At an arbitrary time instant j, the aggregate power consumption of the k-th VHC can be expressed as: $\hat{y}_j = \hat{s}_j w^{(k)}$, wherein:

$$\hat{s}_j^{(k)} = [m_k, \Sigma_{i=1}^{m_k} \mu_{1,j}^{(i)}, \Sigma_{i=1}^{m_k} \mu_{2,j}^{(i)}, \ldots, \Sigma_{i=1}^{m_k} \mu_{n,j}^{(i)}]. \quad \text{(Equation 9)}$$

Meanwhile, an aggregate power consumption of the whole datacenter (or r VHCs) can be expressed as: $y_j = \hat{s}_j \tilde{w}$, wherein:

$$\hat{s}_j = [\hat{s}_j^{(1)}, \hat{s}_j^{(2)}, \ldots, \hat{s}_j^{(r)}], \quad \text{(Equation 10)}$$

and $$\tilde{w} = [w^{(1)}, w^{(2)}, \ldots, w^{(r)}]^T, \quad \text{(Equation 11)}$$

in which $\hat{s}_j^{(k)}$ and $w^{(k)}$ are defined by Equations 9 and 8, respectively. Detailed transformations of the above equations are provided in Example 4 below.

With the measured aggregate power vector of the whole datacenter (Equation 1), the following least square estimation (LSE) problem can be formulated as the training model for the r PMFs of the datacenter:

$$\min_{\tilde{w}} \sum_{j=1}^{t} (\hat{s}_j \tilde{w} - y_j)^2. \quad \text{(Equation 12)}$$

By solving the above problem, optimal coefficients for the r PMFs appearing in w can be obtained, with which the power consumption of individual servers in different VHCs can be estimated by providing corresponding state vectors.

However, the above LSE training model can only capture only one constant term appearing in the coefficient vector, and not capture multiple constant terms. Consequently, if there are more than one VHC in the datacenter (r>1), the resultant constant terms (i.e., $w_0^{(1)}, w_0^{(2)}, \ldots, w_0^{(r)}$) from Equation 12 are not accurate. In other words, the idle power of servers in each VHC cannot be estimated by this model. Therefore, additional steps need to be performed to estimate the constant terms in PMFs.

A widely used energy saving strategy in many datacenters is to shutdown idle servers. The shutdown servers are turned on again when the working servers cannot satisfy the workload. Such a scenario provides an opportunity to estimate the constant terms in PMFs.

For example, in a datacenter with r VHCs, at an arbitrary time instant j, if h servers are turned off (or on), and meanwhile a power decrease (or increase) in the aggregate power consumption of the whole datacenter, $\Delta y(\Delta y > 0)$, is detected, then $\Delta y$ can be captured and associated with the number of h servers in an off/on event. $\Delta y > 0$ is used to indicate that only an absolute value is considered.

Figure 11:
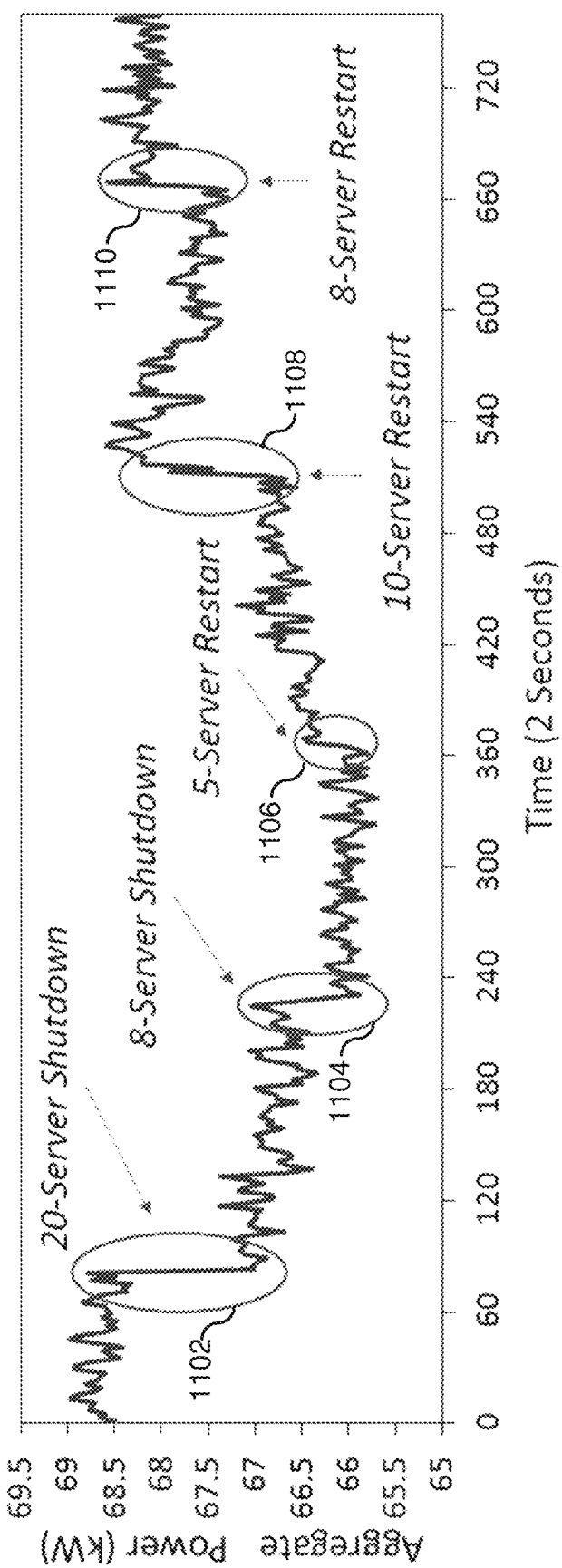
FIG. 11 is a graph of example aggregate power changes captured while turning groups of servers in a datacenter off and on over a period of time.

FIG. 11 is a graph showing example off/on events captured turning groups of servers in a datacenter off and on over a given time period. For example, 1102 is a captured decrease in aggregate power associated with a shutdown of 20 servers. 1104 is a captured decrease in aggregate power associated with a shutdown of 8 servers. 1106 is a captured increase in aggregate power associated with a restart of 5 servers. 1108 is a captured increase in aggregate power associated with a restart of 10 servers. 1110 is a captured increase in aggregate power that is associated with a restart of 8 servers. From FIG. 11, it can also be observed that off/on events for a large proportion of servers can still be detected and captured even though the aggregate power of the whole datacenter always fluctuates over time.

If t off/on events have been captured in the datacenter consisting of r VHCs, then for the j-th ($1 \le j \le t$) off/on event, a counting vector can be defined as:

$$d_j := [d_j^{(1)}, d_j^{(2)}, \ldots, d_j^{(r)}], \quad \text{(Equation 13)}$$

wherein $d_j^{(k)}$ stands for the number of turned-off (or turned-on) servers in the k-th VHC at time j, and the detected (mean) power decrease (or increase) is $\Delta y_j$. Then the following optimization problem can be formulated to find an optimal estimation of the constant terms, i.e., $$w_0 = [w_0^{(1)}, w_0^{(2)}, \ldots, w_0^{(r)}]^T:$$

$$\min_{w_c} \sum_{j=1}^{t} (d_j w_0 - \Delta y_j)^2. \quad \text{(Equation 14)}$$

In the estimation of the constant terms of PMFs, the optimization strategy using Equation 14 can be combined with a manual setup with information from technical specification of servers. For servers that can be shut down, e.g., the computing nodes, it can be straight-forward to gather off/on events and estimate the idle power via the optimization method. For other IT units that cannot be shut down during the operation of datacenter, e.g., admin nodes, the server's technical specification can be used to ascertain its idle power consumption. Alternatively, idle power consumption can be approximated using information from other servers equipped with similar hardware components that can be shut down.

After the PMFs are created, they can be used to estimate the real-time power consumption of individual servers by referring to real-time component states from the corresponding servers.

However, to make PMFs more accurate, training datasets can be used to train the PMFs. In some cases, a training dataset can contain complete component states, i.e., all possible component states of the servers in each VHC. However, in real-world datacenter operations, it can be hard to stress each of the components in a server to work through all possible states. Thus, in some cases, a training dataset collected in a time interval of several hours or even several days may be incomplete. In these cases, there is no guarantee that the training dataset covers all possible state information. This phenomenon may result in inaccurate PMFs.

Simply collecting training data as much as possible, however, may not be a good solution to the above problem due to two reasons: (1) the larger the training dataset, the higher the overhead in PMF training, and (2) more redundant data entries will be collected while they do not contribute to the improvement of PMFs. The following selective data collection strategy can be used to avoid these issues.

First, an update time interval is set for the training dataset, denoted as $\Delta t_1$. At an arbitrary time instant j, the components states collected from r VHCs can be expressed as $\tilde{s}_j$ (Equation 10). Along with a measured aggregate power consumption of the datacenter at the same moment $y_j$, a data entry in the training dataset can be represented as $(\tilde{s}_j, y_j)$. With data entry of $(\tilde{s}_j, y_j)$, the process of selective training data collection can include the following steps:

Step 1: Normalize each element in $\tilde{s}_j$ with the corresponding maximum value, i.e., rescale the values of each element to [0, 1]. The maximum value could be found from a technical specification, such as a maximum I/O speed, or if unknown, it could be set as a value higher than any possible values of the state.

Step 2: Compare the normalized data entry with those in the training dataset. If it already exists, go to Step 4. Otherwise, go to Step 3.

Step 3: If the normalized entry already exists in the training dataset, the backup the power value $y_j$ for the existing entry with the same component states. Otherwise insert $(\tilde{s}_j, y_j)$ into the training dataset as a new entry.

Note that in Step 3, if the normalized entry already exists, the redundant entry is not simply discarded. Instead, a record of its power value is kept. Thus, one data entry in the training dataset may have multiple power values. In such a case, a median of multiple power values can be the final value used in the entry for PMF training. Using the median can alleviate the effect of outliers and can make the PMF training more robust.

In addition to the collection of component states, the same strategy can also be applied to the collection of the off/on events for constant terms estimation.

Figure 5:
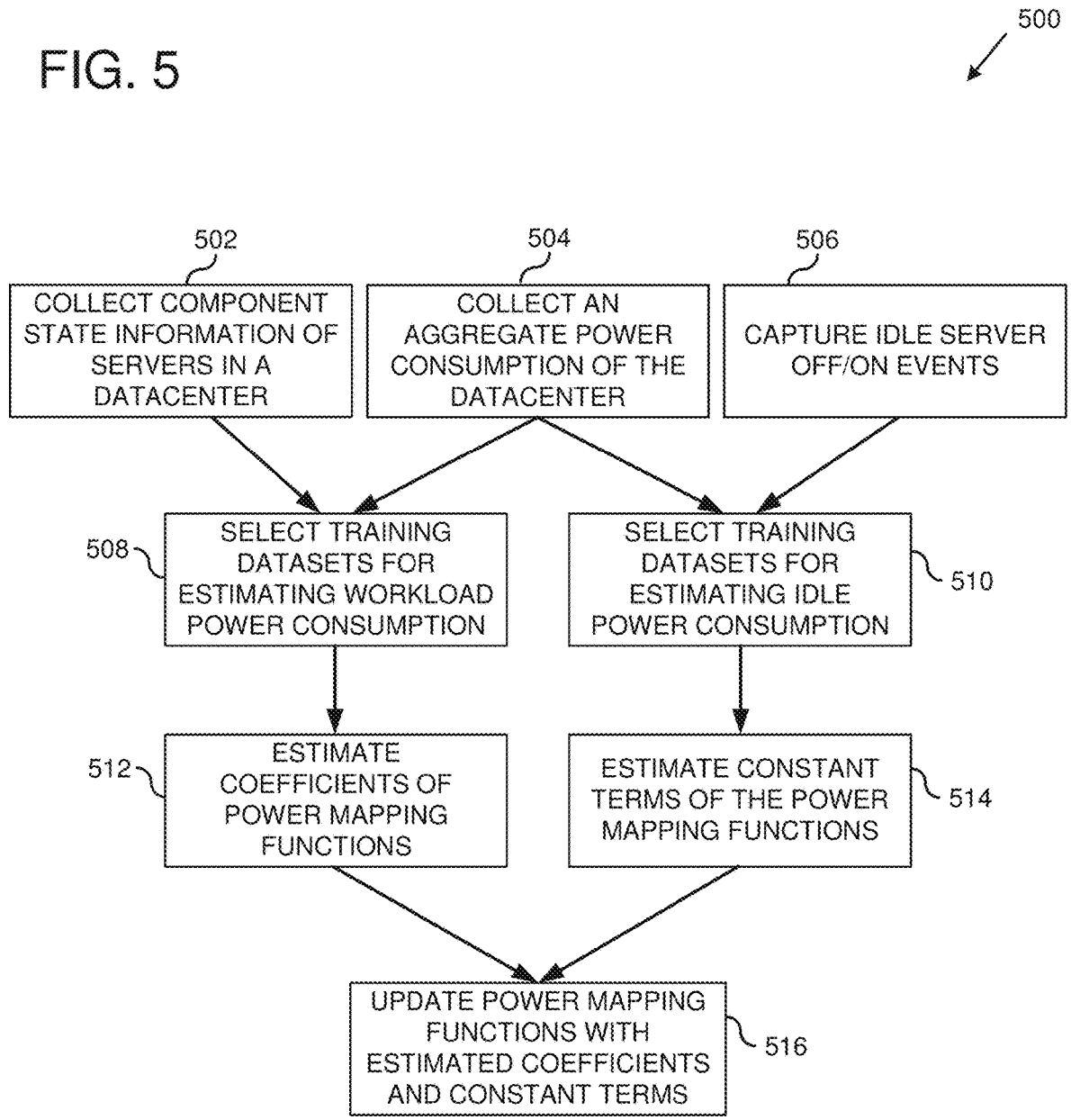
FIG. 5 is a flowchart depicting an example method for training and updating power mapping functions (PMFs).

FIG. 5 is a flowchart depicting an example method 500 for training and updating PMFs. At 502, component state information of servers in a datacenter is collected. At 504, an aggregate power consumption of the datacenter is collected. At 506, idle server on/off events are captured.

At 508, the component state information collected at 502 and the aggregate power consumption collected at 504 are used to select training datasets for estimating workload power consumption. At 512, the training datasets selected at 508 are used to estimate coefficients of variable terms of the PMFs.

At 510, the aggregate power consumption collected at 504 and the off/on events captured at 506 are used to select training datasets for estimating idle server power consumption. At 514, the training datasets selected at 510 are used to estimate constant terms of the PMFs.

At 516, the PMFs are updated with the coefficients estimated at 512 and the constant terms estimated at 514.

For the selective data collection described above, the resolution of the normalized component states can determine the maximum number of data entries in the training dataset. Assuming that a datacenter consists of $r (r \geq 1)$ VHCs, each having $n_k$ ($1 \leq k \leq r$) component states, and that a preset resolution of normalized component states is $p(0<p<<1)$, then the number of data entries in the training dataset is upper-bounded by $$\sum_{k=1}^{r}\left\lceil\frac{1}{p^{n_k}}\right\rceil.$$

A proof is provided below in Example 5.

In some cases, with the above data collection strategy, the training dataset may eventually become complete as time goes on. However, datacenter scaling-out (i.e., adding computing resources) and/or scaling-up (i.e., upgrading IT facilities) may lead to changes of PMFs. In this case, a new training dataset needs to be collected with the same procedure, and PMFs need to be updated accordingly.

Complexity of PMFs Update

The PMFs can be updated at a regular basis, e.g., every $\Delta t_2$ interval time, using the most updated training dataset. The PMFs update can be carried out during the normal running of the datacenter and has very small overhead.

According to an analysis of PMF training complexity provided in Example 6 below, the complexity of PMF training has a linear growth with increase of data entries and a quadratic growth with increase of component states. However, as explained above, the number of the training data entries has an upper bound of $$\sum_{k=1}^{r}\left\lceil\frac{1}{p^{n_k}}\right\rceil.$$

In many cases, this is not a large number (less than 10,000 in one experiment). Furthermore, as discussed in Example 2 below, a small number of component states (e.g., 6 in one experiment) can be sufficient to provide accurate PMFs in some cases.

In some examples, the training dataset is selectively updated and duly applied to update PMFs in the background and, at foreground, the real-time component state information is used to obtain server-level power estimations.

Example 2—NIPD System

This example provides a particular embodiment of the technologies described herein for illustration purposes. This particular embodiment comprises a 326-node server cluster comprising 12 (blade) server racks that house 306 CPU nodes, 16 disk array nodes, 2 I/O index nodes, and 2 admin nodes, each running a Linux kernel. Table 2 shows the detailed configuration of each type of server used in this example:

TABLE 2

Example Configuration of Server Nodes

| Node Type | configurations | Number |
|---|---|---|
| CPU Node | 2 X Intel Xeon E5-2670 8-core CPU(2.6 G)<br>8 X 8 GB DDR3 1600 MHz SDRAM<br>1 X 300 G 10000 rpm SAS HDD | 306 |
| Disk Array Node | 1 X Intel Xeon E5-2603 4-core CPU(1.8 G)<br>4 X 4 GB DDR3 ECC SDRAM<br>1 X 300 G 10000 rpm SAS HDD<br>36 X 900 G SAS HDD Networking Switches | 16 |
| I/O Index Node | 2 X Intel Xeon E5-2603 4-core CPU(1.8 G)<br>8 X 4 GB DDR3 ECC SDRAM<br>1 X 300 G 10000 rpm SAS HDD | 2 |
| Admin Node | 2 X Intel Xeon E5-2670 8-core CPU(2.6 G)<br>8 X 16 GB DDR3 1600 MHz SDRAM<br>1 X 300 G 10000 rpm SAS HDD | 2 |

Figure 12:
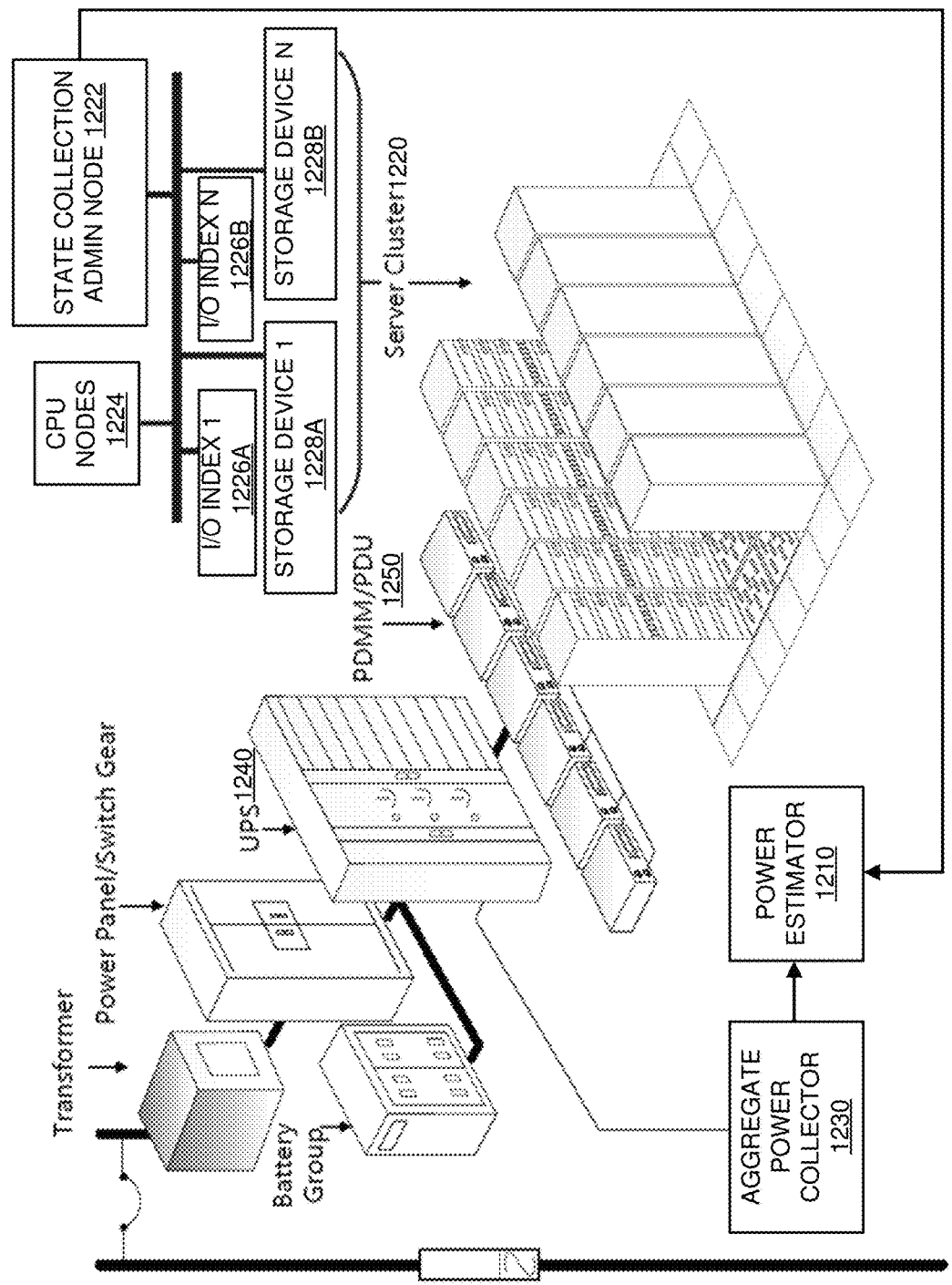
FIG. 12 is a diagram depicting an example system for estimating server power consumption in a datacenter comprising an aggregate power collector, a power estimator, and a state collection node in a server cluster of the datacenter.

FIG. 12 is a diagram depicting the example system 1200 for performing NIPD in a datacenter comprising an aggregate power collector 1230, a power estimator 1210, and an administrative node 1222 in a server cluster 1220.

Data Collection

Referring to FIG. 12, aggregate power consumption of the IT infrastructure of the datacenter is collected by aggregate power collector 1230 via a UPS 1240 interface and a power monitoring proxy. An arbitrary sampling interval can be set. The sampling interval can be, for example, 2 seconds. Besides the UPS 1240, the datacenter is further equipped with 6 Power Data Management Modules (PDMMs) 1250 as part of PDUs, each of which can provide power measuring at the rack-level at the sampling interval. Power estimations can be verified by collecting collect the power consumption of each rack via corresponding PDMMs 1250 using rack proxies (not shown).

The administrative node 1222 is used to collect the component state information from each node (e.g., 1224, 1226A-B, and 1228A-B). The administrative node 1222 can use the same sampling rate or a different sampling rate than the aggregate power collector 1230. In some cases, the sampling rate of the administrative node 1222 can be a rate of 1 second. The dstat tool, a widely-used resource statistic tool, can be used to gather various component states of a server, as shown in Table 3. Other tools can also be used, such as vmstat, iostat, mpstat and netstat.

TABLE 3

Example Component State Metrics Collected Using dstat

| Component | State label | Description |
|---|---|---|
| processor | usr | CPU utilization for user processes |
| | sys | CPU utilization for system processes |

TABLE 3-continued

Example Component State Metrics Collected Using dstat

| Component | State label | Description |
|---|---|---|
| | idle | CPU in idle |
| | wai | CPU utilization for I/O waiting |
| memory | used | memory usage for processes |
| | buff | buffer memory |
| | cach | cache memory |
| | free | free memory |
| disk | read | disk reading amount |
| | write | disk writing amount |
| network | recv | traffic amount that the system received |
| | send | traffic amount that the system sent |
| paging | in | # pages changes from disk to memory |
| | page | # pages changed from memory to disk |
| system | int | System interruption time |
| | csw | Context switch times |

Rather than using all states information provided by dstat, for training PMFs, the following 6 state metrics from the collected states in Table 3 can be used: total CPU utilization (1-idle), total memory utilization (1-free), disk reading/writing (read/write) and network traffic receiving/sending (recv/send). In some cases, the utilization metrics can be limited to these 6 for training purposes since: (1) the selected metrics can often cover the major hardware components of the server, and (2) including other metrics can increase the overhead of training PMFs but do may not improve the accuracy of PMFs.

Estimation of Idle Power

For the estimation of idle power (or constant terms in PMFs) of CPU nodes 1224 in this example, idle nodes are identified and remotely turned off and on. For remote operation, the industry-standard Intelligent Platform Management Interface (IPMI) can be used to turn the servers off and on. During the on/off time period, multiple off/on events and corresponding power changes are captured from event logs and data logs, respectively. These off/on events are fed into an optimization model to estimate the constant terms (idle power) of the CPU nodes 1224.

In this example, the idle power of I/O nodes 1226A-B, and admin node 1222 cannot be estimated by turning them off and on remotely because they are not allowed to be shut down for the normal operation of the running datacenter. Since the number of these two-server types is quite small in this example (only 2 for each type), and their hardware configurations are similar with that of CPU nodes 1224, their idle power can set as the same as that of CPU nodes in this case. The disk array nodes 1228A-B also need to be kept on all the time. However, their hardware configurations are not similar to the hardware configurations of the CPU nodes 1224. Therefore, the idle power of the disk array nodes 1228A-B is from their working power range by making use of rack power measurements.

The precision and complexity of the example NIPD solution for power monitoring can be evaluated at the rack level and the server level, respectively.

Table 4 summarizes the values of example parameters set in the example NIPD system:

TABLE 4

Example Parameter Settings for the Example NIPD system

| Parameter | Setting |
|---|---|
| number of VHCs (r) | 4 |
| number of component states ($n_k$) | [6, 6, 6, 6] |
| normalizing resolution (p) | 0.01 |

TABLE 4-continued

Example Parameter Settings for the Example NIPD system

| Parameter | Setting |
|---|---|
| training dataset update interval ($\Delta t_1$) | 2 seconds |
| PMFs update interval ($\Delta t_2$) | 5 minutes, 0.5 hours |

The example parameter settings in Table 4 are based on the following considerations:

Number of VHCs (r): According to the example server node configurations in Table 1, the nodes in the datacenter can be logically divided into 4 VHCs, and the number of servers in each VHC is 306, 16, 2, 2, respectively.

Number of component states ($n_k$): As discussed above, 6 component states are chosen states for PMFs training as well as power estimation of individual servers.

Normalizing resolution (p): In the update of a training dataset, the resolution of normalized data in each entry is set as 0.01, which, as discussed further below, can be precise enough for accurate PMFs training in some cases. A higher resolution will increase the size of training dataset as well as PMFs training complexity.

Interval for updating training dataset ($\Delta t_1$): In this example, this interval is set to the same value as the sampling interval for aggregate power consumption, which in this case is 2 seconds. Setting the update interval of the training dataset to the same value as the sampling interval can enable training data to be collected quickly.

PMFs update interval ($\Delta t_2$): An initial value for the PMF update interval is set as 5 minutes, which is based on an estimation of PMFs training time needed under the theoretical maximum size of training dataset. Over time, as the training dataset size begins to stabilize, the update interval is changed to 0.5 hours to reduce the overhead of the PMFs update.

Power Monitoring at the Rack Level

By putting the real-time component state information of the servers into the corresponding PMFs, the power consumption of each server can be estimated. The estimated power consumption of all servers in the same rack can then be aggregated to produce an estimated power consumption of the rack. To measure an error rate of this rack-level estimation, the mean relative error (MRE) metric can be used that is defined by:

$$MRE := \frac{1}{t}\sum_{j=1}^{t}\left|\frac{y'_j - y_j}{y_j}\right| \quad \text{(Equation 15)}$$

where t is the number of data entries in the dataset, and $y_j$ and $y'_j$ are the ground truth and estimated rack power for the j-th data entry, respectively.

By running different benchmarks shown in Table 5, training data can be collected for various workloads and used to update the PMFs.

TABLE 5

Example workloads for NIPD evaluations.

| Workload | Description | Purpose |
|---|---|---|
| Idle | Only background OS processes | Server-level validation |
| Peak | Stress CPU usage to 100% malloc memory until 100% | |

TABLE 5-continued

Example workloads for NIPD evaluations.

| Workload | | Description | Purpose |
|---|---|---|---|
| SPECint | gcc | Compiler | Training data collection and PMFs update |
| | gobmk | Artificial Intelligence: go | |
| | sjeng | Artificial Intelligence: chess | |
| | tonto | Discrete Event Simulation | |
| SPECfp | namd | Biology/Molecular Dynamics | |
| | wrf | Weather Prediction | |
| | tonto | Quantum, Checmistry | |
| IOZone | | Filesystem benchmark tool | |
| Synthetic | | Occupy CPU randomly Read/write memory randomly | Rack-level validation |

Figure 13:
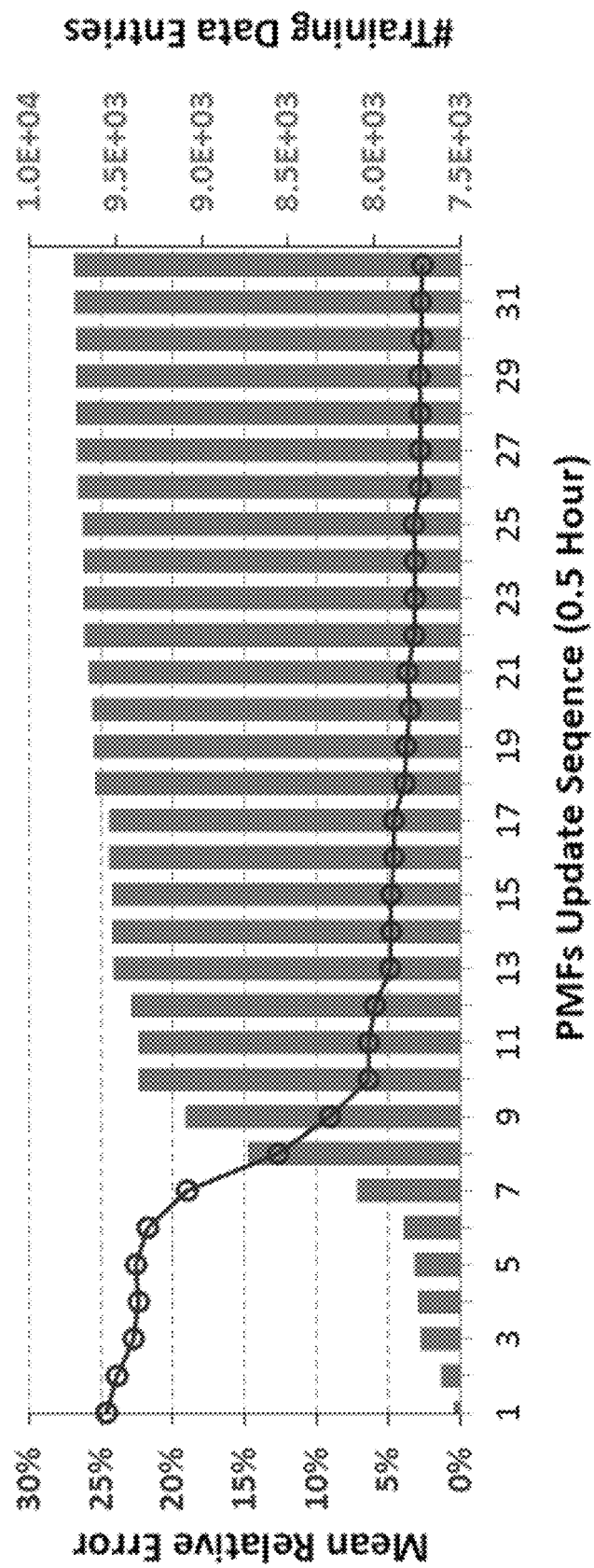
FIG. 13 is a graph depicting a decrease in a mean relative error (MRE) of power estimation using updated PMFs as a number of entries in a training dataset increases.

In one scenario, after each PMF update, the synthetic workloads listed in Table 5 are run, power consumption and server component states are collected, and the MRE of the power estimation with updated PMFs is calculated. FIG. 13 is a graph depicting MREs and the corresponding numbers of entries in the training data set. FIG. 13 illustrates that MRE monotonically decreases with the increase of training dataset, and tends to be stable at a value strictly smaller than 5%.

Figure 14:
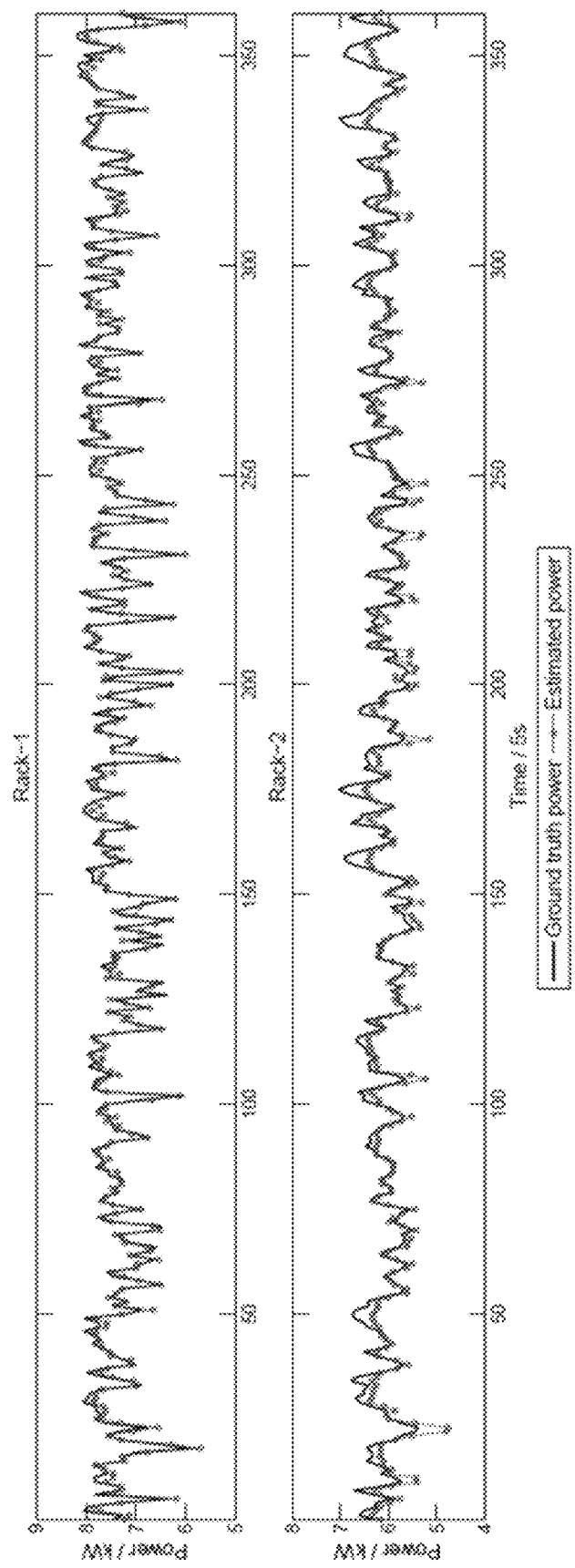
FIG. 14 shows two graphs depicting example estimated power consumptions for two server racks with corresponding ground truth values.

To illustrate the performance results more clearly, power estimation results for two server racks: Rack-1 and Rack-2 (in 0.5 hours) are shown in FIG. 14, along with the respective ground truth power values. In this example, the MREs for the power estimation of Rack-1 and Rack-2 1.29% and 4.55%, respectively.

Figure 15:
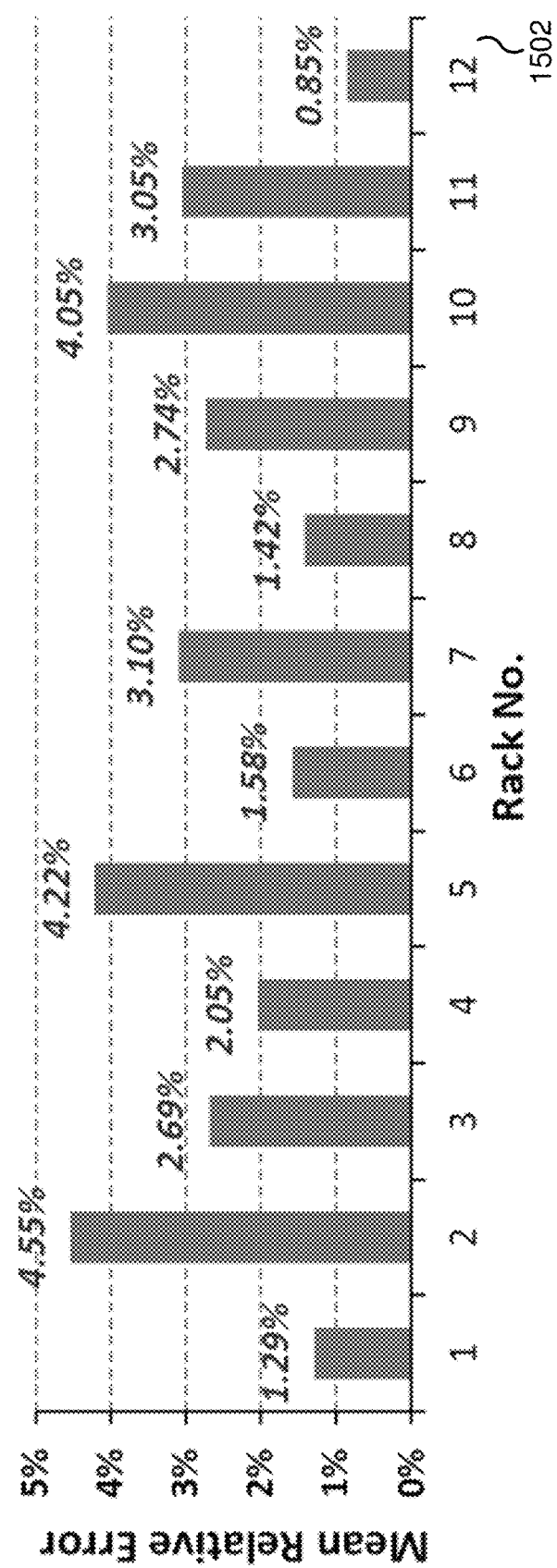
FIG. 15 is a graph depicting overall performance (in terms of MREs) of an example NIPD system using updated PMFs to estimate power consumption of servers in multiple server racks.

To have a view of the overall performance in the datacenter, example MRE values over all 12 racks the example datacenter are depicted in FIG. 15. Based on the MRE values depicted in FIG. 15, an average MRE over the entire datacenter is 2.63%.

In cases where power consumption of a rack is very stable, variable terms may be excluded from a PMF. For example, in this particular example, Rack-12 1502 is dedicated to an InfiniBand (IB) switch and has a very stable power consumption around 2.5±0.1 kW. Only the constant term was used for power estimation of Rack-12 and resulted in an MRE of 0.85%.

Power Monitoring at Server Level

In some cases, it can be difficult to fully validate the accuracy of power estimation at the server level. For example, some servers, such as blade servers, are designed to be highly integrated in the rack. In scenarios like this, it is difficult to assemble sensors/meters inside individual servers. In addition, multiple servers may share the same power supply so it is also hard to obtain server level power outside the servers.

In these cases, although ground truth power consumption for individual nodes cannot be recorded, knowledge about idle power and peak power or working power range of each server type can be obtained. Idle power of CPU nodes in the datacenter can be estimated by turning idle CPU nodes off and on, as described in more detail above. Peak power (or name plate power) can be learned by referring to nameplate power provided by the server vendor. Additionally, some racks may contain only CPU nodes and disk arrays. In these cases, all the CPU nodes can be shut down, leaving only the disk arrays running to obtain the working power range of the disk arrays by measuring power consumption at the rack-level. For a disk array node, in many cases its power consumption is usually larger, but relatively more stable, compared with that of a CPU node. A working power range of a disk array node can be estimated rather than the idle/peak power by making use of rack-level power. The measured or estimated idle/peak power and working power range of the servers in the example datacenter are illustrated in Table 6. These values are used as references to evaluate server-level power estimation in this example.

TABLE 6

Example Idle/Peak power of CPU Nodes and
Example Power Range of Disk Array Nodes

| Node type | Referred metric | Power (range) |
| --- | --- | --- |
| CPU node | Idle power | 75.4 Watts |
|  | Peak power | 200 Watts |
| Disk array node | Power range | 1020~1170 Watts |

Power Disaggregation of the Datacenter

Using PMFs trained from the aggregate power readings of the IT facilities in this example, real-time power consumption of individual servers is estimated. To illustrate the performance, four CPU nodes and two disk array nodes are chosen as test nodes. Of the four CPU test nodes, two of them run the peak workload (listed in Table 4), and the other two firstly keep idle for 15 minutes and then the run peak workload for another 15 minutes. The two disk array test nodes left running and available to other processes.

Figure 16:
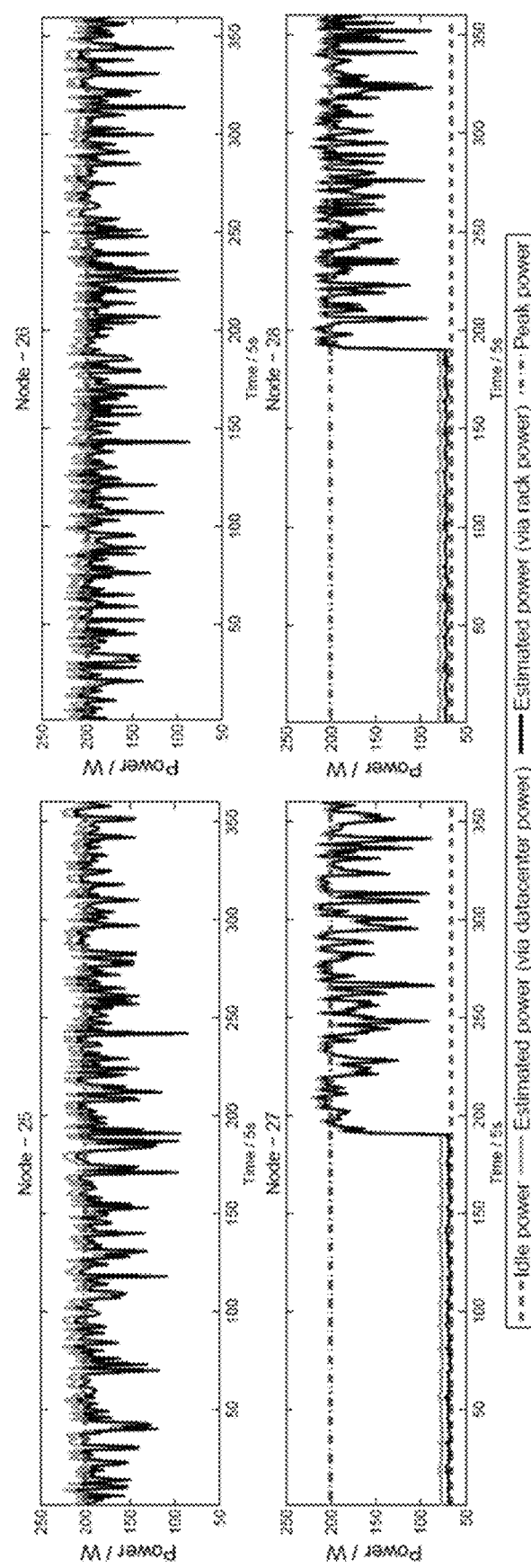
FIG. 16 shows four graphs depicting estimated power consumptions for four example nodes using updated PMFs and aggregate datacenter power consumption, compared to estimated power consumptions for the nodes using rack power consumption.
Figure 17:
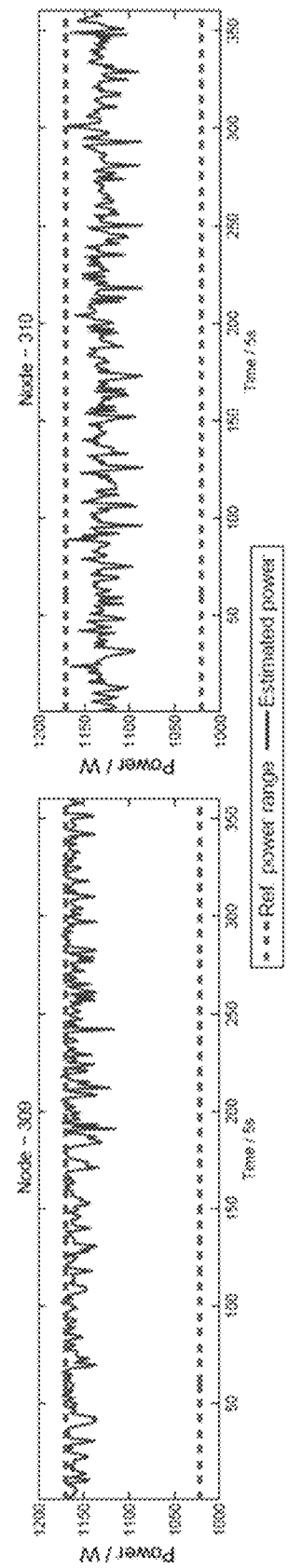
FIG. 17 shows two graphs depicting example estimated power consumptions for two disk array nodes using updated PMFs and their referred power ranges.

FIG. 16 shows four graphs depicting the estimated power consumptions for the four CPU test nodes using the PMFs compared to power consumptions for the four CPU test nodes estimated using rack power consumption. FIG. 17 shows two graphs depicting the estimated power consumptions for the two disk array test nodes using the PMFs compared to their referred power ranges. From these results, it can be seen that both the estimated idle/peak power for the CPU test nodes and power consumption for the disk array test nodes are close to the referred power ranges. With respect to the referred idle/peak power values of the CPU test nodes, the MRE is 10.27% and 8.17% for the estimation of the idle power and peak power, respectively. Peak power values refer to the power readings when the CPU utilization is 100%. By checking the performance under these two extreme cases, we can validate the effectiveness of the example NIPD system.

In some cases, the estimated power values are slightly larger than the referred ones. This is can occur because, when disaggregating the datacenter power, the power loss during the transmission (e.g., by wire and PDUs) as well as power consumed by some shared facilities (e.g., network switches and datacenter accessories) are assigned to individual servers.

Power Disaggregation of Racks

When a datacenter is capable of monitoring power consumption of each rack, the technologies described herein can be used to disaggregate the rack-level power consumption into server-level power consumption. In scenarios where the servers in a rack are homogeneous, the number of VHCs can be set to one. In this case, the computational complexity for training PMFs will be much lower than that in a heterogeneous environment.

In one particular example, a test rack which contains 28 CPU nodes and 2 I/O index nodes was selected. Since the number of CPU nodes is much larger than that of the I/O index nodes, and the CPU nodes' working power ranges are very similar, the selected rack can be considered to be approximately homogeneous. Historical data is collected historical data from the selected rack and used for PMF training. (Since the selected rack is considered to be approximately homogenous, in this case only one VHC is created for the servers in the rack and, thus only one PMF is created and trained.) The updated PMF is used to make estimations under idle/peak workloads for individual servers in the selected rack. The resulted idle/peak power estimation of four CPU test nodes using rack-level power is illustrated in FIG. 16.

It can be observed from FIG. 16 that, at least in some cases, server-level power estimation by disaggregating the rack power is slightly better than that of disaggregating the entire datacenter power. The MRE of the four CPU test nodes is 6.92% and 6.30% for the estimation of idle power and peak power, respectively. This can be because the impact of hardware components not modeled in PMFs is smaller at the rack level than at the level of the whole datacenter. Thus, if rack-level power information is available, it may be better to directly disaggregate the rack-level power than to disaggregate the power of the entire datacenter.

Example 3—NIPD as Middleware

As the technologies described herein can provide fine-grained power information at the server level, they can be used as middleware in some embodiments to support different power management applications.

Figure 18:
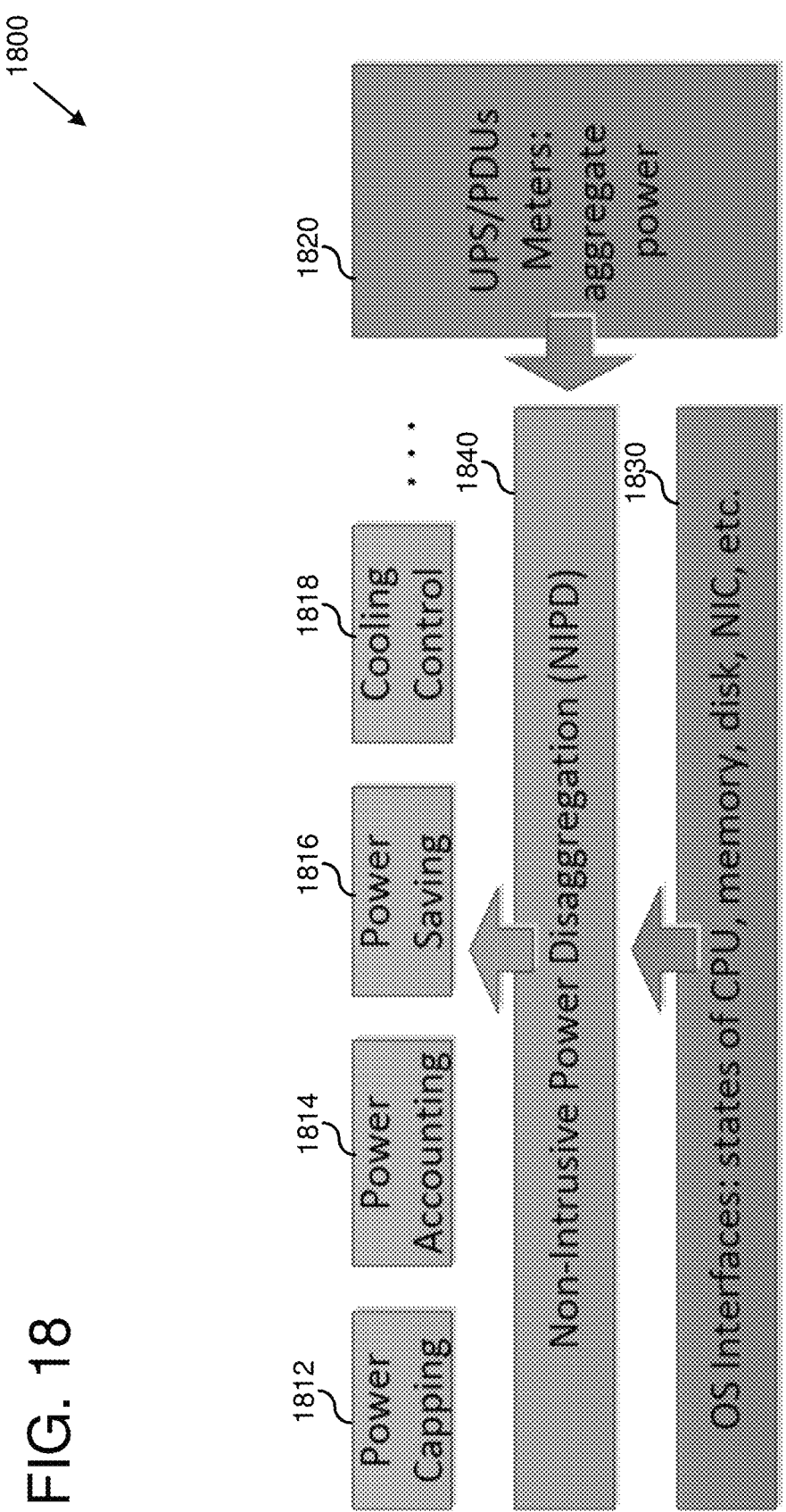
FIG. 18 is diagram depicting and example NIPD system as a middleware component supporting various datacenter power management applications.

FIG. 18 is a diagram depicting an example system 1800 comprising a NIPD sub-system 1840 as a middleware component supporting various datacenter power management applications. In example system 1800, component state information is provided to NIPD sub-system 1840 via a plurality of operating system interfaces. The component state information provided comprises states of CPU(s), memory, disk(s), NIC(s), etc. Aggregate power of the datacenter is provided to NIPD sub-system 1840 by one or more UPS/PDUs meters 1820. NIPD sub-system 1840 is configured to generate server-level power consumption estimates using techniques described herein and to provide the server-level power consumption estimates to example power management applications 1812-1818. The example power management applications are described further below.

Figure 19:
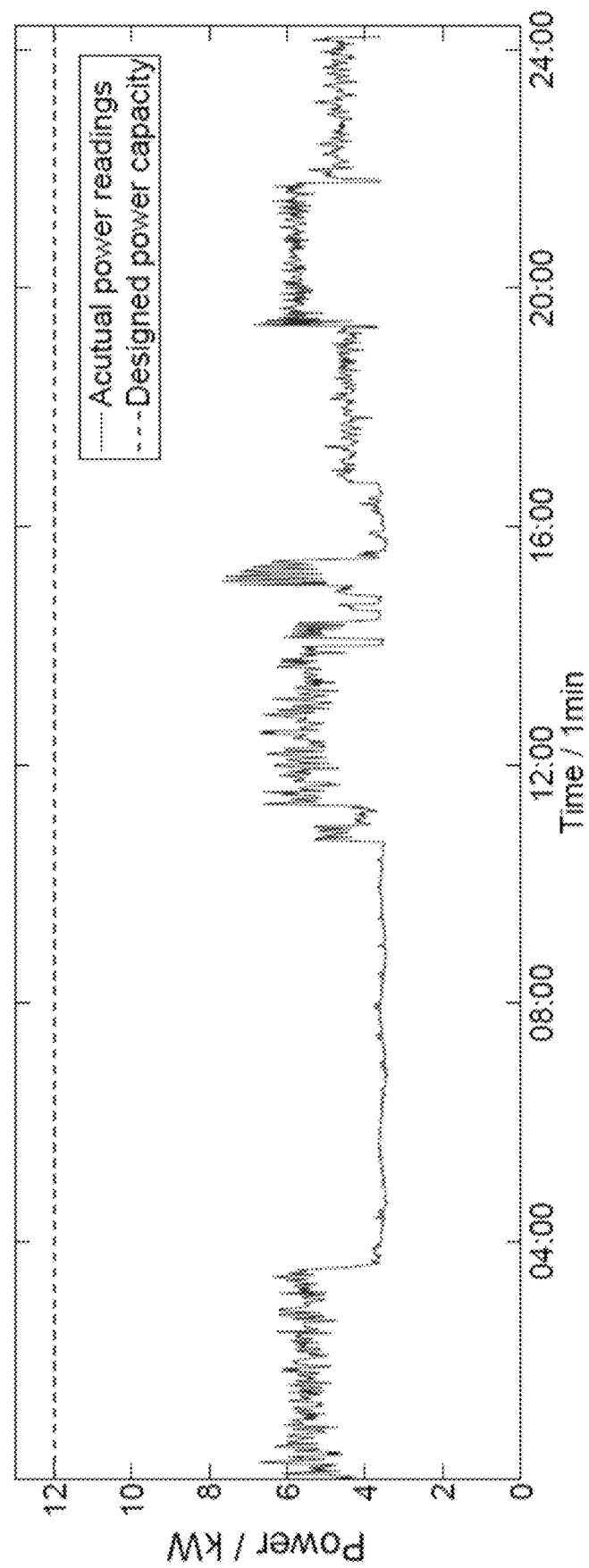
FIG. 19 is a graph depicting example power readings for a server rack in a datacenter compared to the server rack's designed power capacity.

Power Capping 1812: The power capacity of IT facilities estimated by servers' nameplate ratings can be much higher than the actual server power consumption. A graph depicting example power readings of a server rack compared with the rack's designed power capacity is shown in FIG. 19. As shown in FIG. 19, in some cases the average power consumption of a rack can be less than or equal to 60% of the designed power capacity. In such cases, with server-level power information provided by NIPD sub-system 1840, unused power can be allocated to support new system requirements without the risk of oversubscribing the power supply. When integrated with power capping technologies, such as Dynamic Voltage and Frequency Scaling (DVFS) and workload migration, NIPD can avoid the overrun of the power infrastructure.

Figure 20:
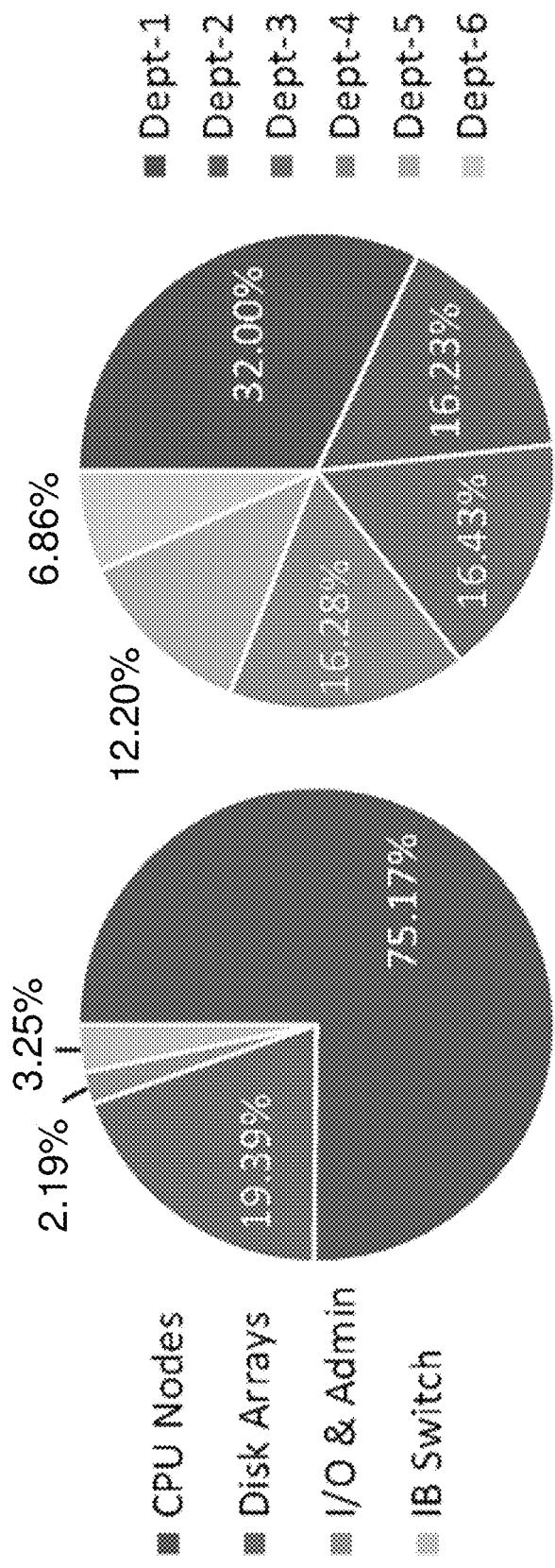
FIG. 20 shows two graphs power accounting examples using server-level power estimation.

Power Accounting 1814: The fine-grained power information obtained from NIPD sub-system 1840 can also be used for power accounting from different perspectives. For example, as shown in FIG. 20 (Left), the energy contributions from different server types in a datacenter can be derived, which can be used for better analysis of power efficiency. Furthermore, if the servers in the datacenter are dedicated to certain users from different departments, the NIPD sub-system 1840 can be applied for departmental power accounting, as the example shown in FIG. 20 (Right). Such departmental power accounting can be used to gain insights into user behavior from the perspective of power consumption, and to accurately charge different users in colocation datacenters for their respective electrical power consumption.

Others: Based on results from NIPD sub-system 1814, the power consumption characteristics of different servers, workloads, and/or users can be analyzed and corresponding energy-saving policies 1816 can be adopted. For example, the power efficiency of different server types under the same workloads can be measured and used by to choose the most energy-conservative servers for performing similar workloads in the future. In addition, the server-level power information can be used to draw the power distribution map of the datacenter, which provides clues to identify or predict "hot spots" for more intelligent cooling systems 1818.

Example 4—Equation Transformations

This example provides details of transformations of Equations 9 and 10.

Transformation of Equation 9

For a VHC consisting of m servers, each with n component states, given its PMF in the form of Equation 5 and state vector in the form of Equation 4, the aggregate power consumption at time j can be expressed as:

$$\hat{y}_j = \sum_{i=1}^{m} f(s_j^{(i)}) \quad \text{(Equation 16a)}$$
$$\quad \text{(Equation 16b)}$$
$$= f(s_j^{(1)}) + f(s_j^{(2)}) + \ldots + f(s_j^{(m)}) \quad \text{(Equation 16c)}$$
$$= [m, s_j^{(1)} + s_j^{(2)} + \ldots + s_j^{(m)}]w \quad \text{(Equation 16d)}$$
$$= \hat{s}_j w$$

where $$\hat{s}_j = [m, s_j^{(1)} + s_j^{(2)} + \ldots + s_j^m] \quad \text{(Equation 17a)}$$
$$= \left[m, \sum_{i=1}^{m} \mu_{1,j}^{(i)}, \sum_{i=1}^{m} \mu_{2,j}^{(i)}, \ldots, \sum_{i=1}^{m} \mu_{n,j}^{(i)}\right] \quad \text{(Equation 17b)}$$

Transformation of Equation 10

Assuming that a datacenter consists of r VHCs and the PMF of the k-th (1≤k≤r) VHC is denoted in the form of Equation 7, then at an arbitrary time instant j, the aggregate power consumption generated by r VHCs can be expressed as:

$$y_j = \sum_{k=1}^{r} \sum_{i=1}^{m_k} f_k(s_j^{(i)}) \quad \text{(Equation 18a)}$$
$$\quad \text{(Equation 18b)}$$
$$= \sum_{k=1}^{r} \{f_k(s_j^{(1)}) + f_k(s_j^{(2)}) + \ldots + f_k(s_j^{(m)})\} \quad \text{(Equation 18c)}$$
$$\quad \text{(Equation 18d)}$$
$$= \sum_{k=1}^{r} \{[m, s_j^{(1)} + s_j^{(2)} + \ldots + s_j^{(m_k)}](w^{(k)})^T\}$$
$$= \tilde{s}_j \tilde{w}$$

where $$\tilde{s}_j = [\tilde{s}_j^{(1)}, \tilde{s}_j^{(2)}, \ldots, \tilde{s}_j^{(r)}] \quad \text{(Equation 19)}$$

and $$\tilde{w} = [w^{(1)}, w^{(2)}, \ldots, w^{(r)}]^T, \quad \text{(Equation 20)}$$

in which $\hat{s}_j^{(k)}$ and $w^{(k)}$ are defined by Equations 9 and 8, respectively.

Example 5—Proof of an Upper Bound on Training Dataset Entries

Given a datacenter with r(r≥1) VHCs, each with $n_k$ (1≤k≤r) component states, for each data entry in the training dataset in form of (s̃, y), the number of non-constant elements of s̃ is $\Sigma_{k=1}^{r} n_k$ (referring to Equation 9). Then, for each of the elements, as the normalizing resolution is set as p and the normalized range is [0, 1], the number of its possible values is $$\left\lceil \frac{1}{p} \right\rceil.$$

Therefore, the total number of possible combinations, i.e., the values of s̃, is $$\left\lceil \frac{1}{p^{n_1}} \right\rceil + \left\lceil \frac{1}{p^{n_2}} \right\rceil + \ldots + \left\lceil \frac{1}{p^{n_r}} \right\rceil, \text{ i.e., } \sum_{k=1}^{r} \left\lceil \frac{1}{p^{n_k}} \right\rceil.$$

Example 6—PMFs Training Complexity

For PMFs training, the optimization model established in Equation 12 can be used to find the optimal PMFs coefficients, which can essentially fall into the form of least square linear regression. With t data entries in the training dataset, the closed-form solution to the least square regression problem (Equation 12), i.e., the PMFs coefficients w̃, can be expressed as:

$$\tilde{w} = (S^T S)^{-1} S^T \hat{y}, \quad \text{(Equation 21)}$$

where $S = [\tilde{s}_1, \tilde{s}_2, \ldots, \tilde{s}_t]^T$ and $\hat{y} = [y_1, y_2, \ldots, y_t]^T$.

Assuming that the total number of component states for all VHC's is n, $n = \Sigma_{k=1}^{r} m_k$ where $m_k$ denotes the number of component states for the k-th VHC, the time complexity to get w̃ from Equation 21 is $O(n^2 \cdot t)$.

Example 7—Computing Systems

Figure 21:
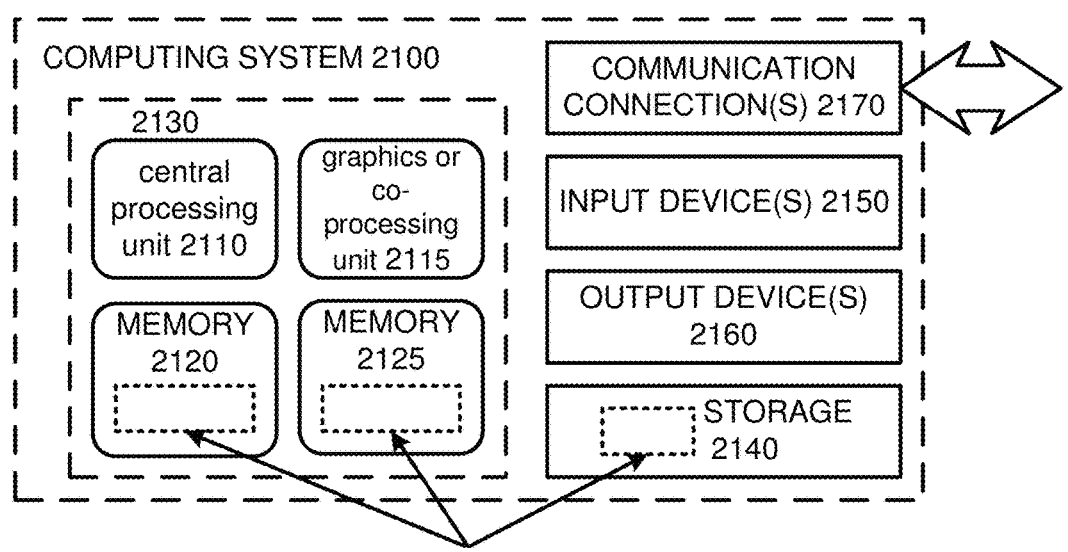
FIG. 21 is a diagram of an example computing system in which some described embodiments can be implemented.

FIG. 21 depicts a generalized example of a suitable computing system 2100 in which the described innovations may be implemented. The computing system 2100 is not intended to suggest any limitation as to scope of use or functionality, as the innovations may be implemented in diverse general-purpose or special-purpose computing systems.

With reference to FIG. 21, the computing system 2100 includes one or more processing units 2110, 2115 and memory 2120, 2125. In FIG. 21, this basic configuration 2130 is included within a dashed line. The processing units 2110, 2115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s). The memory 2120, 2125 stores software 2180 implementing one or more innovations described herein, in the form of computer-executable instructions suitable for execution by the processing unit(s).

A computing system may have additional features. For example, the computing system 2100 includes storage 2140, one or more input devices 2150, one or more output devices 2160, and one or more communication connections 2170. An interconnection mechanism (not shown) such as a bus, controller, or network interconnects the components of the computing system 2100. Typically, operating system software (not shown) provides an operating environment for other software executing in the computing system 2100, and coordinates activities of the components of the computing system 2100.

The tangible storage 2140 may be removable or non-removable, and includes magnetic disks, magnetic tapes or cassettes, CD-ROMs, DVDs, or any other medium which can be used to store information in a non-transitory way and which can be accessed within the computing system 2100. The storage 2140 stores instructions for the software 2180 implementing one or more innovations described herein.

The input device(s) 2150 may be a touch input device such as a keyboard, mouse, pen, or trackball, a voice input device, a scanning device, or another device that provides input to the computing system 2100. For video encoding, the input device(s) 2150 may be a camera, video card, TV tuner card, or similar device that accepts video input in analog or digital form, or a CD-ROM or CD-RW that reads video samples into the computing system 2100. The output device(s) 2160 may be a display, printer, speaker, CD-writer, or another device that provides output from the computing system 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 22:
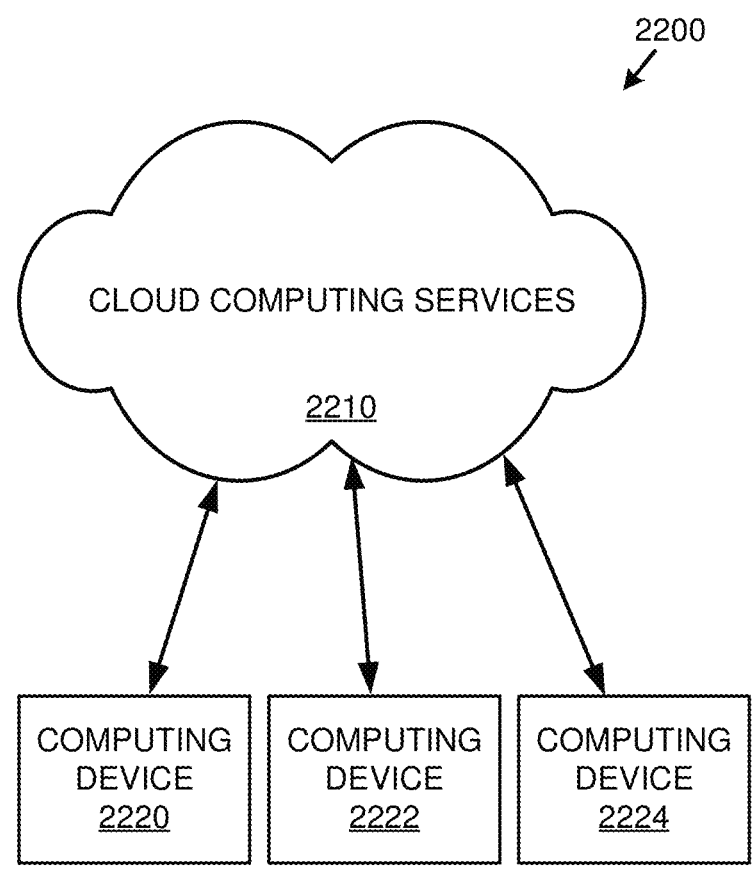
FIG. 22 is an example cloud computing environment that can be used in conjunction with the technologies described herein.

FIG. 22 depicts an example cloud computing environment 2200 in which the described technologies can be implemented. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a datacenter of a business or organization) or distributed (e.g., provided by various computing resources located at different locations, such as different datacenters and/or located in different cities or countries).

The cloud computing services 2210 are utilized by various types of computing devices (e.g., client computing devices), such as computing devices 2220, 2222, and 2224. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 21, computer-readable storage media include memory 2120 and 2125, and storage 2140. The term computer-readable storage media does not include signals and carrier waves. In addition, the term computer-readable storage media does not include communication connections (e.g., 2170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, Python, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method implemented by one or more computing devices, the method comprising:
    grouping a plurality of servers in a datacenter into multiple virtual homogenous server clusters (VHCs), wherein the multiple VHCs comprise groups of servers with same or similar types of hardware components;
    collecting hardware component state information of the plurality of servers in the datacenter, wherein component state information of the servers is associated with VHCs, of the multiple VHCs, in which the servers are grouped;
    creating a power model comprising multiple power mapping functions associated with the multiple VHCs, wherein a power mapping function is created using the component state information collected for an associated VHC;
    determining an aggregate power consumption of the datacenter;
    determining, without a power sensor, an approximate real-time power consumption of one of the servers in a VHC, of the multiple VHCs, at a particular time, wherein the determining comprises using the power mapping function associated with the VHC, the aggregate power consumption of the datacenter, and a current component state information for hardware components of the one of the servers at the particular time; and
    outputting the approximate real-time power consumption of the server.

2. The method of claim 1, wherein determining an approximate real-time power consumption of the one of the servers in the VHC, of the multiple VHCs, comprises correlating states of hardware components of the one of the servers to an overall power consumption of the one of the servers.

3. The method of claim 2, wherein the correlating comprises determining a linear relationship between the states of the hardware components of the server and the overall power consumption of the server.

4. The method of claim 1, wherein at least one of the power mapping functions receives an input of a server component state vector at a particular time instant and produces an estimated power consumption of the server at the particular time instant based on the component state vector and the aggregate power consumption of the datacenter.

5. The method of claim 1, wherein at least one of the power mapping functions comprises a constant term that indicates an estimated idle power consumption of a server in a VHC associated with the power mapping function, and multiple variable terms that indicate estimated power consumptions of the server in the VHC when running multiple workloads.

6. The method of claim 5, wherein the constant term is determined by:
    measuring power changes when a plurality of idle servers in the VHC are turned off and on multiple times; and
    performing a least square minimization analysis using the measured power changes to determine the constant term that indicates an estimated idle power consumption of a server in the VHC.

7. The method of claim 5, wherein the multiple variable terms comprise coefficients determined by:
    determining total power consumptions for the datacenter at multiple points in time;
    determining component states of a plurality servers at the multiple points in time while the plurality of servers run the multiple workloads; and
    performing a least square minimization analysis using the total power consumptions of the datacenter and the component states of the plurality of servers to determine the coefficients.

8. The method of claim 5, further comprising:
    training the power mapping function by analyzing a training dataset and updating the constant term and the multiple variable terms based on the analyzing.

9. The method of claim 8, wherein the training dataset comprises:
    multiple collected total power consumption values for the datacenter; and multiple collected component states of the plurality of servers.

10. The method of claim 8, wherein the training dataset comprises:
multiple collected total power consumption values for the datacenter; and
medians of multiple collected component states of the plurality of servers.

11. The method of claim 1, wherein the component state information of the plurality of servers comprises:
index values associated with utilizations of hardware components of the plurality of servers, the utilizations of the hardware components comprising:
central processing unit utilizations,
graphical processing unit utilizations,
memory utilizations,
storage device utilizations, and
network interface card utilizations.

12. The method of claim 11, wherein the utilizations of the hardware components further comprise hardware performance monitoring counters.

13. A system comprising:
a datacenter comprising a main power supply and a plurality of servers, wherein the plurality of servers comprise multiple hardware components, wherein the plurality of servers are organized into multiple virtual homogenous server clusters (VHCs), wherein the multiple VHCs comprise groups of servers with same or similar types of hardware components;
a datacenter power data collector connected to the main power supply of the datacenter and configured to determine an aggregate power consumption of the plurality of servers in the datacenter;
a component state collector connected to the plurality of servers and configured to retrieve component state information for the multiple hardware components from the plurality of servers;
a power estimator configured to:
receive and analyze data from the datacenter power data collector and the component state collector,
update a power model comprising one or more power mapping functions based on the analyzing of the data from the datacenter power data collector and the component state collector,
associate the one or more power mapping functions with the multiple VHCs,
identify a VHC, of the multiple VHCs, to which one of the plurality of servers belongs, and
use a power mapping function associated with the identified VHC, an aggregate power consumption of the datacenter, and current state information for hardware components of the one of the plurality of servers at a particular time to determine, without a power sensor, an approximate power consumption of the one of the plurality of servers at the particular time; and
a display device connected to the power estimator and configured to display the approximate power consumption of the one or more of the plurality of servers determined by the power estimator.

14. The system of claim 13, wherein the component state collector, the power estimator, and the datacenter power data collector comprise one or more servers in the datacenter.

15. The system of claim 13, wherein:
the datacenter power data collector is configured to determine the aggregate power consumption of the plurality of servers in the datacenter by reading an embedded meter or vendor-provided interface linked to the main power supply of the datacenter.

16. The system of claim 13, wherein the main power supply comprises an uninterruptible power supply and power distribution units that energize the datacenter.

17. One or more non-transitory computer-readable media storing computer-executable instructions for causing one or more processors, when programmed thereby, to perform operations comprising:
identifying multiple virtual homogenous clusters of servers (VHCs) in a datacenter, wherein the multiple VHCs comprise groups of servers with same or similar types of hardware components;
creating a training dataset by:
collecting component state information comprising hardware component utilization metrics for the servers in the datacenter at multiple times,
collecting aggregate power consumption readings for the datacenter at multiple times by accessing an interface to a main power supply of the datacenter, and
associating the collected component state information with the collected aggregate power consumption readings based on corresponding collection times;
using the training dataset to create multiple power mapping functions associated with the multiple VHCs;
receiving a hardware component state vector for a server in the datacenter comprising hardware component utilization metrics for the server at a particular time;
determining an aggregate power consumption for the datacenter at the particular time by accessing the interface to the main power supply of the datacenter;
identifying a VHC, of the multiple VHCs, to which the server belongs;
determining, without a power sensor, an estimated power consumption of the server at the particular time using a power mapping function, of the multiple power mapping functions, associated with the identified VHC, the received hardware component state vector comprising the hardware component utilization metrics for the server at the particular time, and the determined aggregate power consumption for the datacenter; and
providing the estimated power consumption of the server to one or more datacenter power management applications.

18. The one or more non-transitory computer-readable media of claim 17, wherein the operations further comprise:
updating the training dataset periodically with additional collected component state information and additional aggregate power consumption readings; and
updating the multiple power mapping functions using the updated training dataset.

19. The method of claim 1, wherein the determining the aggregate power consumption for the datacenter comprises determining an aggregate power vector for the datacenter.

20. The system of claim 13, wherein the power estimator is further configured to:
determine the aggregate power consumption of the datacenter using an aggregate power vector for the datacenter.

* * * * *